US006508058B1

United States Patent
Seaverson

(10) Patent No.: US 6,508,058 B1
(45) Date of Patent: Jan. 21, 2003

(54) HYDRAULIC CONTROL SYSTEM WITH TACTILE FORCE AND POSITION FEEDBACK

(76) Inventor: Louis A. Seaverson, 10474 Dale Cir., Westminster, CO (US) 80234

( * ) Notice: Subject to any disclaimer, the term of this patent is extended or adjusted under 35 U.S.C. 154(b) by 32 days.

(21) Appl. No.: 09/809,233

(22) Filed: Mar. 15, 2001

(51) Int. Cl.[7] .............................. F15B 13/14; B25J 3/00
(52) U.S. Cl. ................. 60/393; 91/434; 414/5
(58) Field of Search ...................... 60/390, 392, 393; 91/434, 370; 414/5

(56) References Cited

U.S. PATENT DOCUMENTS

| | | |
|---|---|---|
| 3,880,304 A | 4/1975 | Strickland, Jr. |
| 4,394,102 A | 7/1983 | Batchelder et al. |
| 4,516,894 A | 5/1985 | Stolpp |
| 4,893,981 A | 1/1990 | Yoshinada et al. |
| 5,000,650 A | 3/1991 | Brewer et al. |
| 5,002,454 A | 3/1991 | Hadank et al. |
| 5,018,922 A | 5/1991 | Yoshinada et al. |
| 5,019,761 A | 5/1991 | Kraft |
| 5,497,568 A | 3/1996 | Strickland |
| 5,516,249 A * | 5/1996 | Brimhall ..................... 414/5 |
| 5,943,914 A * | 8/1999 | Morimoto et al. ............ 414/5 |

* cited by examiner

Primary Examiner—Edward K. Look
Assistant Examiner—Michael Leslie
(74) Attorney, Agent, or Firm—Rick Martin; Patent Law Offices of Rick Martin, P.C.

(57) ABSTRACT

An apparatus for translating the movements of a portion of an operators anatomy residing in communication with an input fitment into hydraulic signals thereby directing the motion of a machine member moved by a hydraulic driver with natural motion of the operator. The subject apparatus also transfers the motion of the machine member under control to a proportional motion of the control fitment, giving the operator a tactile sense of the direction and magnitude of the motion being executed by the machine member under the control of the apparatus. Additionally, the subject apparatus conveys a force proportional to that experienced as a resistance to movement by a machine member under the control of the apparatus to the operator through the control fitment, giving the operator a tactile sense of the resistance opposing the machine operation being directed by the operator.

31 Claims, 9 Drawing Sheets

HYDRAULIC CONTROL SYSTEM WITH TACTILE FORCE AND POSITION FEEDBACK

FIELD OF THE INVENTION

This application relates to the field of control of hydraulic and pneumatic apparatus, and the feedback of position and effort exerted by hydraulic apparatus to an operator of such apparatus.

BACKGROUND OF THE INVENTION

Hydraulic and pneumatic powered machines require some means of translating the physical input of an operator into movement of the various members of the machine. Traditionally an operator manipulates the individual members of such a machine using some device (a manipulator) to operate directional valves that supply power to actuators that move each movable member comprising the machine. In the simplest of equipment, an operator is provided with a lever that is connected to a 4 way valve, one such assembly for every axis of motion the machine affords. Pushing or pulling a given lever moves a given machine member about its axis. The operator can also move the levers in sets or multiples to move more than one of the machine members simultaneously about their various axes. Generally, an operator visually inspects the machine to determine the position of the machine members (machine configuration). Feedback to the operator using such a scheme is limited to visual inspection of the machine and what the machine's performance and the operator's experience and his other senses impart to him regarding the conditions of load and resistance during any operation. Furthermore, in the simplest form of control, as the number of axes of movement are multiplied, the ability of the operator to visually inspect the response of the machine to his input and to manipulate multiple valves to move simultaneously about multiple axis becomes increasingly taxed. One example of such complexity is found in machines which are anthropomorphic (a machine the members of which are capable of the same range of motion as an analogous human anatomical feature such as a hand and arm). For a machine to duplicate the range of motion of a human hand and arm would require at least 27 axes of motion, which is probably beyond the ability of even the most skilled operator to operate smoothly if presented with a single lever control for every axis of motion.

Some schemes have been advanced wherein an operator inputs movement to a machine using a manipulator that is designed such that it breaks down the natural movement of the operator's input into motion of multiple machine members along multiple axis and transmits signals activating hydraulic cylinders to move a collection of machine members along a path that corresponds to the operator's movement applied to the manipulator. In such schemes the manipulator performs two functions, one function is to permit the machine to be operated by the use of "natural" or "intuitive" motions, that is controlled without the operator having to translate a desired motion into a series of lever manipulations, and the second function is that it limits the operator's movements to those motions that can be carried out by the machine interfaced to the manipulator. Thus, when manipulating machines that are not anthropomorphic, the manipulator constrains the natural movements of the operator to those which the associated machine can execute while providing the operator with an intuitive interface to the machine.

When manipulating more complex machinery a manipulator provides a method of utilizing intuitive or natural operator movements to control simultaneous motion of a plethera of machine members which would not be feasible to control using simple control schemes. These two aspects of a manipulator make it possible for an operator of lesser training to smoothly operate reasonably simple machinery using intuitive input movements, and at the same time make it possible for an operator of any skill level to control a machine with a larger number of machine members operating about a larger number of axes, than would otherwise be feasible.

One central-advantage of using such a manipulator to control a machine, regardless of the complexity of the machine or skill of the operator is that an operator does not have to mentally translate the motion he or she desires the machine member to make into a movement of several control levers, but has only to move the manipulator in a scale duplicate motion of the one the operator desires the machine to perform. One difficulty inherent in using natural motion lies in the fact that uncontrolled motion can lead to dangerous operating conditions in the vicinity of the machine executing an uncontrolled operator command. An operator requires position and force feedback to operate hydraulically and pneumatically powered equipment safely, particularly if the equipment being operated is much larger or smaller in size than the operator.

The prior art includes a number of schemes that provide load sensing along with positional and rate feedback using pressure and position sensors, differential amplifiers, and torque motors. These devices are employed to effect a system in which the application of hydraulic power to the drive device moving a related machine member is varied depending upon the degree in positional difference between the control element and its corresponding machine member, and the back pressure generated by the torque motors against the control elements varies with the operating pressure supplied to the drive devices.

Prior art systems which have been disclosed to help an operator with visual feedback follow. One such scheme is disclosed in U.S. Pat. No. 5,000,650 to Brewer et. al wherein a system of proximity switches and proximity targets is used to determine the position of machine members in machines comprised of jointed, movable members. The proximity switches are electrically connected to suitable devices to automatically cancel operator input to a control valve which has actuated a machine member once the machine member has reached a particular travel limit. No scheme of feedback to the operator of the control members is disclosed.

Several examples exist wherein complex motions can be input on multiple axis manipulators without the necessity of manipulating a multiplicity of input controls. One example of such a scheme is disclosed in U.S. Pat. No. 5,019,761, a manipulator arm with 6 degrees of freedom is disclosed for one handed manipulation of excavation tools having 6 axis of motion. It is claimed that this type of manipulator can be employed with any control and feedback scheme known in the prior art. No specific methods of control and feedback are disclosed.

In U.S. Pat. No. 5,002,454 to Hadank et.al. there is disclosed a configuration of multiple axis control levers which generate electrical signals in response to operator hand movements that are said to provide a more intuitive operation of equipment having multiple axis machine members. No specific scheme of converting the electrical signals into operation of the machine members is disclosed and no scheme of feedback to the control levers is disclosed.

U.S. Pat. No. 3,880,304 to Strickland discloses a system of valve actuating elements mounted on a scale model representation of a digging apparatus. The digging apparatus is comprised of a dipper, a dipper arm, and a crowd arm mounted on a rotating base (to use the descriptive language of the '304 patent). The valve actuating elements each ultimately control a hydraulic directional control valve that supplies hydraulic pressure to a hydraulic actuator which in turn moves one of the members of the digging apparatus. The components of the scale model are mechanically linked by a system of cables, chain drives, and levers to the components of the digging apparatus which they model in such a manner that the motion of the digging apparatus is transmitted to the scale model components. In this manner, the configuration of the digging apparatus is mapped onto the model components, giving a visual readout of the configuration of the digging apparatus to an operator. A system of control knobs and levers is arranged about the scale model of the digging apparatus such that by moving them a lever member is brought to bear on the valve actuating element mounted on the scale model that controls the identical motion in the digging apparatus. Thus moved, the lever member activates the associated valve actuating element, in turn operating the control valve which directs hydraulic fluid into the driving mechanisms associated with the related member of the digging apparatus. A system of pins act as stops which prevent the operator from moving a control lever more than enough to activate the related control valve actuator. Because of the mechanical connection (pulleys, levers, cables) of the scale model to the actual members of the digging apparatus, as the actual members of the digging apparatus are moved, the scale model and thus the control levers mounted on it will move to a correspondingly scaled degree. While this system provides a visual feedback to the operator as to the configuration of the digging apparatus and provides the operator with a sense of the rate at which the digging apparatus is being operated, no feedback of the effort exerted by the system or the resistance of the load being moved is available to the operator from the disclosed system.

U.S. Pat. No. 5,497,568 to Strickland discloses a control system which is adaptable to the portion of the apparatus disclosed in U.S. Pat. No. 3,880,304 that activates hydraulic actuators driving the components of a digging apparatus. This control system employs the same concept of having an operator manipulate levers which are mounted on a scale model of the digging apparatus that in turn activate devices that ultimately direct hydraulic power to actuators powering the various elements of the digging apparatus. Instead of the system of cables, levers, chains, and sprockets employed in the previous patent to link the digging apparatus components and the corresponding components of the model of the digging apparatus, this patent employs hydraulic pumps to supply operating fluid to actuators on the model. The pumps are operated by the hydraulic fluid supplied to the digging apparatus actuators. The output pressure of these hydraulic pumps is directed to actuators that move the related components of the scale model an amount that corresponds to the motion of the digging apparatus. The ratio of the volume of fluid driving the hydraulic pump to the volume of fluid output by the pump is set to reflect the ratio of the volume of the digging apparatus component actuator to the corresponding digging apparatus model component actuator, making motion of a digging apparatus component be reflected in an identical scale motion of the corresponding digging apparatus model component. The disclosed apparatus operates the scale model components with a force which far exceeds the strength of the human operator. Thus, in the apparatus disclosed in the '568 patent, like the apparatus disclosed in the '304 patent, the operator is provided with visual feedback of the digging apparatus configuration which he can alter with an intuitive 3 axis motion, and feedback as to the rate at which the digging apparatus components are moving. No provision is made in the disclosed apparatus to provide the operator with tactile feedback that is within the ability of the human operator to discern that is proportional to that being exerted by the digging machine. Neither is the effort being applied by the digging apparatus communicated to the operator if the apparatus is stalled during an operation.

U.S. Pat. No. 4,394,102 to Batchelder et al discloses an apparatus in which a double acting control cylinder has each chamber connected to one of the two control ports of a pilot valve. The pilot valve is in turn connected to a second double acting cylinder, a pilot cylinder, such that moving the control cylinder operates the pilot valve, which in turn connects one of the chambers of the pilot cylinder to a source of hydraulic power and the other to a pressure relief valve, causing the pilot cylinder to move. The pilot cylinder is in turn mechanically connected to a 4 way control valve. Moving the pilot cylinder actuates the four way control valve which in turn supplies power to a drive cylinder, moving a machine member. A double acting feedback cylinder is fastened to either the drive cylinder piston rod or the machine member. The feedback cylinder is moved correspondingly by the movement of the machine member. The two chambers of the feedback cylinder are connected to the control ports of the pilot valve in such a manner that as the machine member is moved and correspondingly hydraulic fluid is expelled from one chamber of the feedback cylinder and drawn into the other, the fluid acting on the pilot valve control ports is moved in the same manner, causing the pilot valve to return to its neutral position. This in turn permits fluid to flow out of the full chamber of the pilot cylinder and into the empty chamber of the pilot cylinder, returning the control valve to center and discontinuing the application of power to the drive cylinder. Thus it follows that upon movement of the control cylinder, the machine element is correspondingly moved by an amount scaled to movement of the control cylinder and then stopped at that point. This patent further discloses a method of using this control system in multi-axis control devices, and in particular illustrates the use of a scale model digging apparatus fitted with the necessary control components to control a full scale digging apparatus. The disclosed control system when mounted on a scale model of the equipment it is controlling can be used to input desired motions to the equipment being controlled. The system does not provide feedback to the operator regarding the actual configuration of the controlled machine members, it is designed to shut off when the controlled machine members have moved to positions correspondingly in scale to the motion input to the model. Additionally no method is disclosed to provide the operator with feedback regarding the speed at which the controlled machine members are moving nor the force being exerted by the controlled machine members.

Several prior art schemes utilizing a separate driver to exert force against an operator's input are disclosed in the following examples. In U.S. Pat. Nos. 5,018,922 and 4,893,981 both to Yoshinada et al, there is disclosed a control device in which sensors measure the relative positions of a control lever and a machine member, the relative rates of motion of the control level and the machine member, and the load experienced by the driver driving a machine member.

Various schemes are disclosed which utilize this data to actuate a control valve supplying power to the machine member driver and to drive a torque motor which exerts a variable reverse torque against the direction in which the control lever is actuated by the operator.

Finally, U.S. Pat. No. 4,516,894 to Stolpp discloses a multiple axis control arm used to control the motion of hydraulically driven machine members that uses electrically controlled valves to route hydraulic power to the driver devices. The '894 patent discloses that an electric signal arises in response to a detection of a difference in position between a control arm and the corresponding machine member, but does not disclose the means of detecting positional differences nor how the signal is employed to operate the associated control valves. An additional feature disclosed is the use of hydraulic drivers to work against all degrees of motion of the control arm in response to the resistance experienced by the machine members while they are moving. This system uses a variable orifice valve to direct the fluid pressure in the machine member drivers to a corresponding driver acting against a member of the control arm. A piston arrangement balances a reference pressure against the driver line pressure. As the line pressure exceeds the reference pressure, the resulting piston movement opens a control edge that admits fluid at the line pressure until the back pressure rises sufficiently to balance the pressures out, returning the piston to its former location. Admitting machine member driver line pressure increases the pressure in the driver acting against the control arm member, increasing the resistance felt in that member by the operator. In this manner this scheme also employs separate pathways to input operator commands into the machine and send feedback regarding machine operation to the operator.

As was disclosed above, a manipulator must provide a member with a separate axis of motion for each dimension in which input by moving an anatomical feature of a human operator is desired to be utilized to control a machine member. For example, a machine which duplicates the motion available to the upper arm and forearm of a normal human operator would require 5 axes of input. Increasing the number of anatomical features that can be used to input control movement to a machine quickly complicates the number of axes through which a manipulator must accommodate motion. Any one of the above prior art schemes becomes increasingly difficult to execute as each axis is added. Additionally, the scale of the equipment required to carry out these schemes makes miniaturization of the control device (manipulator) difficult when a large number of axes of movement are required. Finally, particularly if a large number of axes are required, tactile feedback to the operator in response to control input is required if an operator is to keep track of the position of the machine and the effort it is exerting, and the speed at which it is operating in response to an operator input.

One of the drawbacks of the various prior art schemes utilizing electro-hydraulic control of machinery is that even with the feedback schemes disclosed, the operator is capable of operating in a "feed forward" mode, where the torque motor supplying "feedback" or the feed back loop sampling the feedback driver can be overpowered so that the input control is considerably in advance of the actual position of the machine member being controlled. This leaves the operator in possession of some knowledge of how hard the machine is working but doesn't give real time information regarding the configuration of the machine. This can lead to dangerous or uncontrolled and unintended movement of a machine member.

Secondly, with the connection between the operator and the machine dependent upon electrical sensing, hysteresis in the sensing components, and mechanical looseness in the system can cause the controlled machine element to effect a "palsy" in its operation, making fine control of the system difficult. Finally, manipulators which offer tactile positional and force feedback for multi-axis machinery must use compact components, small volumes and short plumbing paths. If these considerations are not taken into account in construction of a manipulator, as the number of axis being controlled increases they become too large to be manipulated by an operator, and the response time becomes too slow to be of practical value.

A scheme utilizing a closed hydraulic loop to link a master control cylinder and the related machine member under the control of the master cylinder would eliminate the lack of positional feedback inherent in many systems. A scheme delivering a back pressure proportional to the effort being exerted by the machine member under control to a control input device (a lever or fitment interfaced to an anatomical feature) through the same input lines that are utilized to transmit control information to the machine member being controlled would eliminate the uncertainty exhibited by schemes in which feedback is decoupled from the input device supplying control signals. Finally, a scheme which utilized a minimum of components in the construction of a manipulator (operator input device) would permit making a manipulator that can provide for a large number of axis of movement and still be of a size and weight that it could be fixed to the anatomical features of a human operator. Such a manipulator would permit an operator to control machines having a greater number of independent axis of motion than is now practical. As well it would afford operator control of simple machines using motions more natural or instinctive to the motion which an operator desires the machine to execute. It also affords a control scheme that permits a human operator to control machines which more nearly duplicate natural human motions carried out by limbs and digits secured to such a manipulator than is possible with the present devices.

One embodiment of the present invention utilizes multiple light weight miniature hydraulic cylinders fastened to the moving members of an operators manipulator chassis. Each miniature cylinder operates as an element in a separate closed loop hydraulic system to input operator movement over multiple axis to a series of fluid based feedback/driver control modules, and receives feedback from the feedback/driver control module proportional to the effort exerted by that particular machine member. The feedback/driver control module has a minimum of components, most of which can be mounted off of the manipulator chassis. It will be appreciated by one skilled in the art that the present invention can be equally well practiced utilizing other hydraulic elements than miniature cylinders to drive the closed loop system without departing from the scope of the present invention.

As a further refinement over other schemes, the present invention utilizes the position of the machine elements under control and the line pressure of the fluid used to power the drivers of those machine elements to deliver resistance to the closed loop hydraulic input system, resulting in an input control that follows the position of the controlled machine member and feeds back a resistance to the operators motion that is adjustably proportional to the effort exerted by the controlled machine member.

The present invention also has provision for delivering a signal actuating a valve delivering power to the driver moving the machine member under control that is proportional to the effort that the operator is exerting against the feedback system, thus, by employing a proportional valve receiving this signal, hydraulic power can be supplied to a related machine member driver at a rate that is proportional to the driver's input.

SUMMARY OF THE INVENTION

While this section discloses aspects of the present invention that may be features of various embodiments, it is neither an exhaustive list of the aspects of the invention nor is it meant to imply that all embodiments will manifest all of the disclosed aspects. A given embodiment may manifest less than all or more than all of these aspects without departing from the scope of the present invention.

One aspect of the present invention is to provide an operator of hydraulically powered equipment with a control device (manipulator) which permits control of the hydraulically powered equipment using motions natural to elements of the human anatomy.

Another aspect of the present invention is to provide a method of manipulating hydraulically powered equipment using movement which is within the scope of common human eye/hand coordination.

Another aspect of the present invention is to provide a method of giving real time tactile feedback to an operator of a machine having members driven by hydraulic power which is proportional to the position, rate of motion, and degree of effort being executed by the members of a hydraulic machine.

Another aspect of the present invention is to provide a method of providing a range of tactile feedback that is scalable to various load conditions being subject to operator control.

Another aspect of the present invention is to provide a manipulator device wherein the input members of the manipulator spatially follow rather than anticipate the position of the machine member under manipulator control.

Another aspect of the present invention is to utilize the same hydraulic control circuit used to initiate movement of a controlled machine member to provide the operator of that hydraulic control circuit with feedback regarding force and position of the controlled machine member.

Another aspect of the present invention is to provide a manipulator which can provide control of a machine with a plethora of independent axes of motion using natural human movement to input movement commands to the machine.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
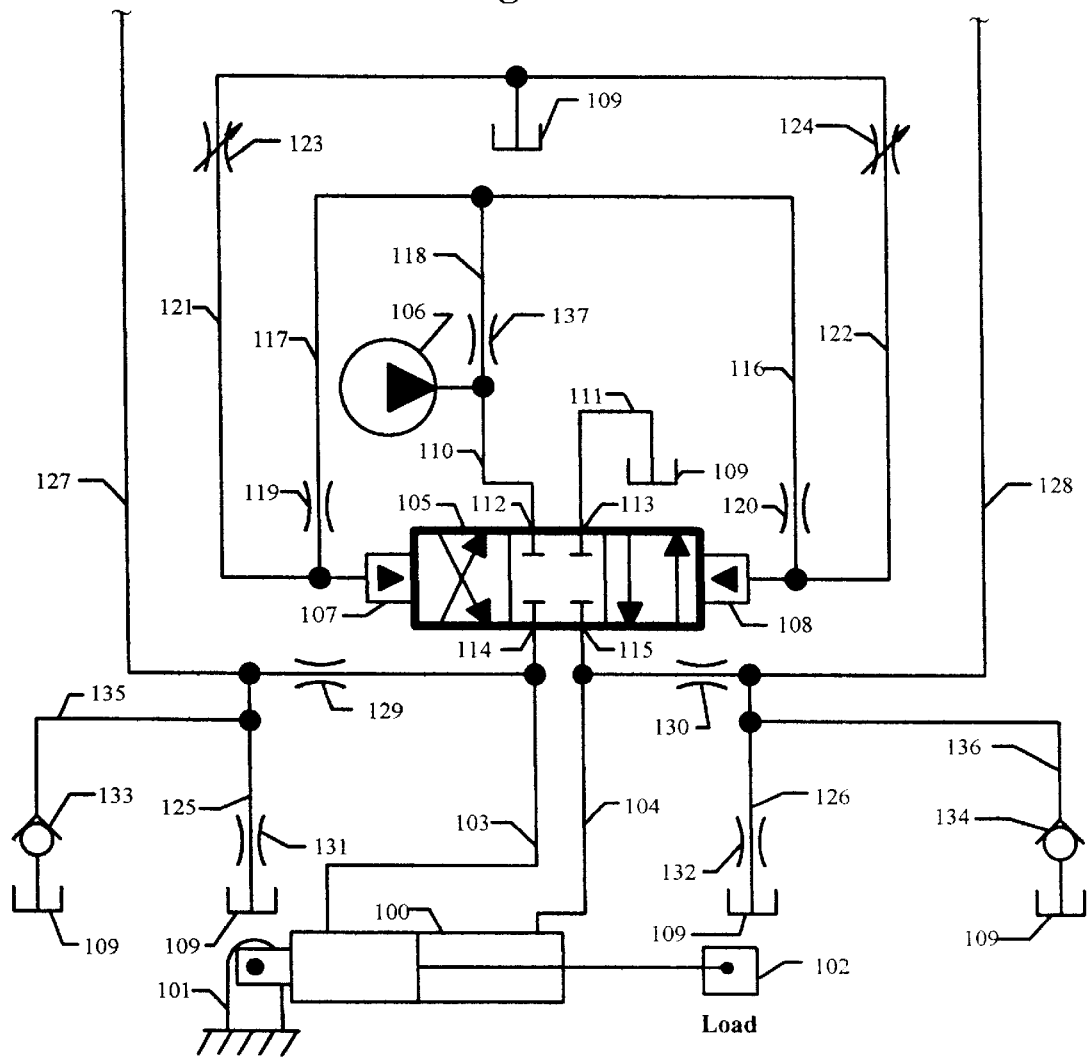
FIG. 1: A SCHEMATIC DRAWING OF THE CONNECTIVITY OF THE ELEMENTS OF A DIRECTIONAL CONTROL VALVES AND DRIVER ACCORDING TO THE PRESENT INVENTION.

The present invention is a system wherein a machine member actuated by a hydraulic driver may be controlled by a manipulator that gives the operator tactile feed back regarding the relative position of the machine member, the speed with which the machine member is moving, and the resistance to motion experienced by the machine member, all feedback being supplied on a scale that is proportionate to the actual forces experienced by the machine members. The scale of forces may be either divided or multiplied to translate those exerted by the machine member to a scale residing within the limits of normal human ability to exert and experience forces.

The present invention incorporates the functions of control and feedback into three subassemblies, disclosed below in separate parts. The present invention utilizes an operator input subassembly, a power control subassembly, and a feedback subassembly.

The power control subassembly incorporates a driver operator, a controllable hydraulic power source, and a method of sampling the hydraulic fluid provided by the power source (a hydraulic fluid sampling conduit).

The power control subassembly inputs a mechanical displacement from the operator input subassembly. This mechanical displacement results in the application of power to an actuator that moves a machine member in an appropriate direction. Once the power control subassembly directs the output of the controllable hydraulic power source to an actuator it also directs a portion of the fluid supplied by the controllable hydraulic power source to a feedback subassembly through a system of hydraulic fluid sampling conduits.

The feedback subassembly inputs the fluid supplied to it from the hydraulic fluid sampling conduits and uses it to generate a force opposing the operator's force that supplied the mechanical displacement to the power control subassembly from the operator input subassembly.

The operator input subassembly outputs a hydraulic fluid displacement from a manipulator interfaced to an operator and produces a mechanical output in response to the movements of an operator against an element of a manipulator. Additionally, the operator input subassembly receives a hydraulic fluid displacement proportional to the movement of a machine member and a force proportional to the load experienced in conjunction with moving a machine member. The operator input subassembly utilizes this input to output a force opposing the operator's input force against a manipulator member corresponding to the machine member it is controlling. The operator input subassembly also moves the manipulator member at a speed and in a position relative to the movement of the corresponding machine member.

The driver operator is a portion of the power control subassembly that receives input from the operator input subassembly and uses it to direct the controllable power source to send power to a driver in a direction that corresponds to the force exerted by an operator on a manipulator member corresponding to the machine member powered by that driver. The controllable power source may employ a directional valve which provides flow rates of hydraulic power that are proportional to the signal from the driver operator or it may utilize a threshold device that turns on full power for a signal above a given value and discontinues it when the signal falls below that value. The conduits providing hydraulic power to a driver are connected to an assembly (a hydraulic fluid sampling conduit) whereby a portion of the hydraulic fluid supplied to a given machine member driver is diverted by it into a feedback subassembly. A separate hydraulic fluid sampling conduit is supplied for each line carrying hydraulic power to a given driver. If the driver is, for example, a double acting hydraulic cylinder, then a hydraulic fluid sampling conduit would be connected to the line supplying each port of the cylinder. The hydraulic fluid sampling conduit is arranged so that fluid supplied to it is supplied at a pressure that is proportionately reduced from that supplied to the machine actuator. The fluid at reduced pressure is directed to the feedback subassembly.

The feedback subassembly receives input from the operator input subassembly and utilizes the fluid sent to it by the hydraulic fluid sampling conduit to develop a force that opposes the input motion received from the operator input subassembly.

In this manner, control of a machine member moving by means of a hydraulic driver is accomplished by translating the movements of a human operator in n axes of motion, using a manipulator having n axes of motion, into a displacement of hydraulic fluid in n number of closed hydraulic systems. The amount by which the fluid is displaced is proportionate to the range over which the operator has moved the manipulator control fitment interfaced to a particular operator anatomical feature, and is a characteristic of the various mechanical and hydraulic elements of the manipulator.

The hydraulic fluid displacement is used to move a machine member (a control member) in communication with the closed loop hydraulic operator input subassembly. In one embodiment the fluid displaced is used to operate a control valve which will send hydraulic power to a driver (also called a hydraulic driver or an actuator) connected to a machine member in such a manner that it causes the driver to move in the direction corresponding to the direction of the movement of the manipulator. The movement of a moving member is used to generate a pressure differential across the pilot ports of a control valve by altering the ratio of two variable orifice members conducting hydraulic fluid supplied by the controllable hydraulic power source past the pilot ports of the valve. Such a pressure differential could be supplied by other arrangements of components utilizing the hydraulic fluid displaced in response to an operator movement of a manipulator control fitment, such as are well known in the art.

In one particular example of this, the pressure differential across the pilot ports of a directional control valve required to operate the valve could be supplied by a double acting miniature hydraulic cylinder. In such an assembly, each chamber of the cylinder is connected to a separate pilot port of a directional control valve. The piston of this cylinder is connected to an operator input subassembly via a control rod such as that disclosed in FIG. 4 as control rod 410. In this manner, movement of a control fitment of a manipulator would cause movement of the cylinder in the manner disclosed below. Fluid would be forced from one chamber of the cylinder and drawn into the other chamber, creating a pressure differential across the pilot ports, actuating a control valve in response to movement of a manipulator fitment. Such a method of controlling the controllable hydraulic power source is not outside of the scope of the present invention.

At the same time power is directed to an actuator, (also called a hydraulic driver) fluid from the controllable hydraulic power source supplying the actuator is directed to a feedback subassembly. In the feedback subassembly, this fluid is utilized to exert a restoring force on a moving member connected to both the operator input subassembly and the power control subassembly. The restoring force acts against the direction of force input by the operator, attempting to restore an associated control rod to its initial position. Unless this restoring force is resisted by an operator by continuing to apply force against the related fitment of a manipulator member in the operator input subassembly, this force will restore a control valve to its neutral position thereby discontinuing the application of power to a related driver. This consequently stops the motion of an associated machine member.

At the same time, the associated machine member is in communication with an element of the operator input subassembly such that the motion of the machine member produces a hydraulic fluid displacement in the closed circuit hydraulic system of the operator input subassembly that is in the opposite direction of the fluid displacement caused by the operator movement which initiated movement of the machine member. This fluid displacement attempts to restore the control rod to its initial position from which it was displaced by movement of the manipulator fitment and to move the manipulator member corresponding to the moving machine member at a rate and displacement proportionate to that of the moving machine member. The net result of the two forces exerted against a force supplied by the operator to a manipulator member is that in response to an operator effort to move a manipulator fitment, force is transmitted back to that fitment through an operator input subassembly hydraulic closed circuit from the feedback subassembly and from the moving machine member. This force is diminished when the control rod is permitted to return to its initial position to a value which is proportionate to that required to hold the associated machine member in a static location. If a force sufficient to overcome that exerted by a feedback mechanism on a control member is exerted against a manipulator fitment, rather than the fitment being held in a constant location, the fitment will be displaced in space by an operator's application of force at a rate and a displacement proportional to the rate and displacement of motion of the associated machine member under control. The effort required to be exerted by the operator to move the manipulator fitment will be proportional to the resistance experienced by an associated machine member in moving. By this process, the same manipulator by which an operator inputs movements into a control system to initiate motion in a machine member is used to give the operator tactile feedback regarding the position of that machine member and the resistance that it is meeting in operating. This feedback is generated by the power and position of a machine member being controlled by the manipulator in real time. Further details of the present invention can best be understood with reference to FIG. 1.

FIG. 1 is a schematic representation of the driver operator, controllable hydraulic power source, and hydraulic fluid sampling conduits. With reference to FIG. 1, in the present invention, a hydraulic driver 100 (shown as a double acting cylinder and piston) is anchored to fixed frame 101 and acts against a load 102 (which could be a movable member of a machine). Driver 100 is supplied hydraulic power via conduits 103 and 104 from a conventional hydraulic pump 106 routed through a conventional 4 way closed center block and spool directional control valve 105. Control valve 105 is operated by pilot ports 107 and 108. Taken together, hydraulic pump 106, control valve 105, reservoir 109 and conduits 110, 111, 103, and 104 constitute a controllable source of hydraulic power.

In one embodiment, valve 105 is actuated by a differential pressure across its pilot ports (ports 107 and 108), and in the conventional manner may be actuated to either connect port 112 with port 114 and port 113 with port 115, causing, as drawn, hydraulic power to be supplied to driver 100 through conduit 103, thus moving the driver in one direction, or actuated to connect port 112 with port 115 and port 113 with port 114, causing hydraulic power to be supplied to driver 100 through conduit 104, thus moving the driver in the opposite direction. The manner in which the ports are connected depends upon whether the pressure is lower in pilot port 107 or pilot port 108, the spool in control valve 105 moving in the direction away from the higher pressure port. Other arrangements, such as will be familiar to one skilled in the art, may be employed to direct power to an actuator moving a machine element without departing from the scope of the present invention.

The internal passageways of the spool and block of control valve 105 may be machined to give an on/off action in response to the pressure differential rising above or falling below a particular value or they may be machined to provide a variable orifice and an attendant variable rate of flow of hydraulic fluid as the spool is driven increasingly to one side or the other by the pressure differential, such as is well known to those skilled in the art. The latter case provides a control system that gradually starts and stops the movement of the machine members associated with a driver under such control. This gradual flow control may impart a smooth transition between full stop and full motion of the machine, which may be desirable in some applications.

In one embodiment, ports 112 and 113 of control valve 105 are connected to hydraulic pump 106 via conduit 110 and to reservoir 109 by conduit 111 respectively. The inlet of hydraulic pump 106 draws fluid via a conduit (not shown) from reservoir 109. All occurrences of reservoir 109 shown in the figures indicate a single reservoir, multiple locations are shown merely for drawing simplicity. Control valve ports 114 and 115 are connected to the two chambers of driver 100 via conduits 103 and 104. Pilot ports 107 and 108 of control valve 105 are connected to conduits 117 and 116 respectively. The other end of conduits 116 and 117 connect to the outlet of hydraulic pump 106 via conduit 118. Fixed orifice members 119 and 120 are interposed in conduits 117 and 116 respectively, upstream, relative to the flow of hydraulic fluid through conduits 116 and 117, of the pilot ports 108 and 107 respectively. Conduits 121 and 122 are joined to conduits 117 and 118 respectively at pilot ports 107 and 108 respectively, thereby connecting pilot ports 107 and 108 respectively to reservoir 109. Variable orifice members 123 and 124 are interposed in conduits 121 and 122 respectively, down stream of the pilot ports 107 and 108. In this configuration, the pressure developed at the pilot ports 107 and 108 when fluid is being pumped by pump 106 is dependant upon a number of factors such as fluid viscosity and density, coefficient of discharge pump outlet pressure, and the ratio of the open area through the fixed and variable orifice members in the conduits connected to each pilot port. In the present invention, once a basic configuration has been selected, the fixed (119/120) and variable (123/124) orifice members can be selected to adjust the ratio of input pressure to pilot port pressure. As the opening of a given variable orifice is reduced, the pressure in the line connected to the pilot port with which that orifice is in communication will rise. Conversely, as the opening is increased, the pressure will drop accordingly. Thus, by closing down one variable orifice member of the 123/124 orifice member pair and opening up the other, a pressure differential will be created between the control valve pilot ports 107 and 108, and the control valve will actuate. The spool of the control valve will move away from the pilot port experiencing the higher pressure, feeding hydraulic power to the driver which moves a machine member in a direction according to which pilot port experienced the higher pressure.

An assembly which functions in this manner can be constructed from conventional components such as a Parker Hannifin model D1VP™ pilot operated directional control and a pair of Parker Hannifin variable orifice valves model MV200™. When individual variable orifice members are employed, the actuators are mechanically tied together so that opening one correspondingly closes the other. Below is disclosed an additional embodiment of this concept which integrates two variable orifice members in a single body.

FIG. 1 is drawn showing a piston type hydraulic driver 100, but any device utilizing hydraulic power to move a load may be equally well employed, such as a rotary actuator and the like as is well known in the art.

One further feature incorporated into the driver operator subassembly is hydraulic fluid sampling conduits 125 and 126, the inlet ends of which are connected respectively to conduits 103 and 104 through which hydraulic fluid from the controllable hydraulic power source flows to driver 100 when control valve 105 is actuated. The outlet ends of hydraulic fluid sampling conduits 125 and 126 are both connected to reservoir 109. In this configuration these conduits are in communication with the fluid pressure developed in driver 100. Shunt conduits 127 and 128 connect hydraulic fluid sampling conduits 125 and 126 respectively to the feedback subassembly. Interposed in conduit 125 upstream (with respect to the normal flow of hydraulic fluid in the system) of the connection point of shunt conduit 127 is fixed orifice member 129. Downstream of shunt conduit 127 fixed orifice member 131 is interposed in conduit 125. In like manner, interposed in conduit 126 upstream of the connection point of shunt conduit 128 is fixed orifice member 130, and downstream of shunt conduit 128 is fixed orifice member 132. In this configuration, a pressure is developed in the hydraulic fluid sampling conduits which is proportional to the pressure developed in the lines supplying hydraulic power to driver 100, conduits 103 and 104. The pressure that develops in the hydraulic fluid sampling conduits is transmitted by shunt conduits 127 and 128 to the feedback subassembly. Orifice members 129, 130, 131, and 132 are sized such that the flow rate through them is minimal, which permits sampling hydraulic fluid without unduly bleeding down the system when directional control valve 1 is centered and no hydraulic power is being applied to the driver. The ratio of orifice openings 129:131 and 130:132 is preferably in the range of approximately 0.5–2, although various embodiments are envisioned in which the ratio may vary between in one case nearly zero and in another case to nearly infinity. Alternative embodiments may employ variable orifice members, such as a needle valve or other mechanism such as is well known in the art, so that the system may be adjusted for different uses or "fine tuned" for a particular collection of components.

In operation, as driver 100 acts against load 102 and experiences increased resistance to load 102 movement, the pressure in the driving line will increase and the pressure in the draining line will fall. Within the limit of load 102 stalling, the driving line will increase to near the maximum outlet pressure which pump 106 can deliver. Concomitantly, as the drain side bleeds off without corresponding driver motion, the drain line pressure will fall to near zero. As drawn in FIG. 1, stalled left movement of load 102 increases pressure ultimately in shunt conduit 128, while it is reduced in shunt conduit 127. Stalled right movement of load 102 reverses this situation, reducing pressure in shunt conduit 128 and building it in shunt conduit 127. The rates of pressure build and drop are dependent upon the pump outlet pressure, the resistance to movement imposed by the load, and the magnitude of the liquid flow resistances imposed by orifices 129, 130, 131, and 132. Of these factors the rates of pressure build and drop are most conveniently controlled in a given system by an appropriate selection of the ratio of the sets of orifice members used in conduits 125 and 126.

In one embodiment of the present invention, shunt conduits 127 and 128 are in communication with a feedback subassembly, which in turn controls variable orifice members 123 and 124 and thus the pressure differential experienced by the control valve 105 pilot ports 107 and 108. The feedback subassembly is next disclosed in FIG. 4.

Figure 4:
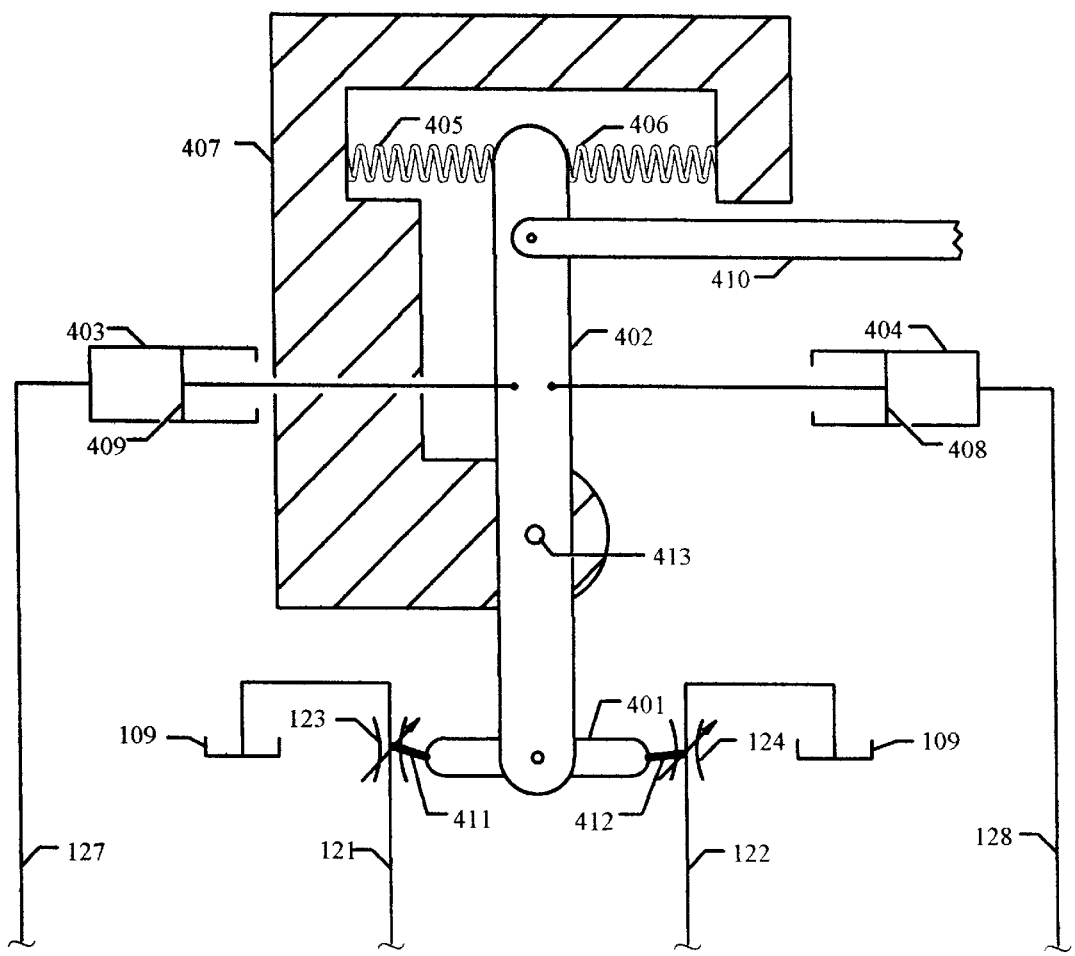
FIG. 4: A SCHEMATIC REPRESENTATION OF THE FEEDBACK SUBASSEMBLY OF THE PRESENT INVENTION.

With reference to FIG. 4, a feedback subassembly is comprised of feedback arm 402 pivotally mounted on frame 407, operated by input rod 410 and feedback drivers 403 and 404. Feedback arm 402 may be centered by springs 405 and 406 for convenience of operation and to bias unintended loads in such a system, for example the inertia or resistance of the various components of a feedback subassembly to move. Spring preloading of elements can also serve to place the components under dynamic tension, leading to less motion lost to mechanical deflection and "windup" during operation.

Control rod 410 is connected to feedback arm 402. Control rod 410 is comprised of any machine element with sufficient stiffness to transmit control motions to feedback arm 402 without undue losses from deflection or compression. Control rod 410 may communicate with control arm 402 directly, as shown, or via a lever arm (not shown) fixed to feedback arm pivot shaft 413 (upon which feedback arm 402 pivots), whereby movement of such a lever arm correspondingly moves feedback arm 402.

Feedback cylinders 403 and 404 are conceptually single acting piston and cylinder type hydraulic drivers. Conceptual feedback cylinders 403 and 404 are linearly disposed 180 degrees apart such that actuation of one cylinder opposes actuation of the other. The pistons 408 and 409 of feedback cylinders 404 and 403 respectively are in communication with feedback arm 402, such that movement of either piston imparts like motion to both feedback arm 402 and the piston of the feedback cylinder opposing it. The cavity of feedback cylinder 403 is connected to feedback conduit 127, which is the same feedback conduit 127 disclosed in FIG. 1. The cavity of feedback cylinder 404 is connected to feedback conduit 128, which is the same feedback conduit 128 disclosed in FIG. 1.

In this configuration, feedback arm 402 may be moved in response to input by control rod 410, or in response to pressure driving piston 409 or 408. When feedback arm 402 is moved, its motion acts to drive variable orifice members 123 and 124. One possible embodiment of this system is shown in FIG. 4. In this embodiment, variable orifice members 123 and 124 are connected by members 411 and 412 to shuttle rod 401. Movement of members 411 or 412 enlarges or constricts the opening in the associated orifice member as feedback arm 402 is rotated.

While feedback arm 402 is shown to be pivotally attached, one skilled in the art will appreciate that the same design can be effected by making feedback arm a slide mechanism Thus feedback arm 402 could be an extension of control rod 410, with a cam, lever, gear, screw, pinion and mechanisms of the like connecting it to the variable orifice members. A shuttling motion of such an assembly would open and close the variable orifice members.

In operation, variable orifice 123 has drive member 411 connected to shuttle rod 401 such that movement of shuttle rod 401 to the left as it is illustrated constricts the orifice of orifice member 123, while movement of shuttle rod 401 to the right enlarges the orifice of orifice member 123. In similar manner, variable orifice 124 is connected to shuttle rod 401 by drive member 412. Movement of shuttle rod 401 to the left as it is illustrated enlarges the orifice of orifice member 124, while movement of shuttle rod 401 to the right constricts the orifice of orifice member 124.

The feedback subassembly operates in the following manner. In response to input via control rod 410, feedback arm 402 is rotated either clockwise or counterclockwise about axis 413. Working fluid is expelled from one of the pair of feedback cylinders 403/404 and drawn into the other one. At the same time the orifice in one of the pair of variable orifice members 123/124 is constricted while the orifice in the opposite member is opened up by the motion of shuttle rod 401 in response to moving feedback arm 402. In response to the change in orifice area, the pressure in the conduit pair 121/122 rises in the conduit having the constricted orifice, and falls in the conduit having the opened up orifice. With reference to FIG. 1, this change in relative pressure in conduits 121 and 122 causes a pressure differential across the pilot ports 107 and 108 of directional control valve 105, causing it to actuate and direct hydraulic power to driver 100. Directing hydraulic power to the driver also sends hydraulic fluid into feedback conduits 127 and 128, and thence into feedback cylinders 403 and 404.

When power is directed to actuator 100, the high pressure side of actuator 100 is in communication with the feedback cylinder whose motion opposes the rotation of feedback arm 402 initially imparted by control rod 410, tending to restore feedback arm 402 to its initial position. When feedback arm 402 is returned to its initial position the openings of variable orifice members 123 and 124, are returned to more or less equal area effective openings which tends to drive the pressure differential between conduits 121 and 122 to zero. With reference to FIG. 1, as the relative pressure in conduits 121 and 122 approaches zero, the pressure differential across the pilot ports 107 and 108 of directional control valve 105 approaches zero, causing the spool in the control valve to return to its neutral position and cutting hydraulic power to driver 100. Shutting off the hydraulic power to the driver also disconnects feed back conduits 127 and 128 from the hydraulic power source. The feedback cylinder which was connected to the high pressure side of the hydraulic power source (either 403 or 404) continues to drive against the direction feedback arm 402 was rotated by the operator to initiate machine element actuator movement (eg, with reference to FIG. 1, actuator 100). This occurs because fluid is still passed through the hydraulic fluid sampling conduits connected to the high pressure side the actuator (with reference to FIG. 1, either conduits 125 or 126) by the action of the load acting against the actuator as the system slowly bleeds down. In such a case, force exerted on feedback arm 402 by feedback cylinders 403 or 404 is balanced by forces exerted in the opposite direction by the operator's input subassembly through control rod 410, which is disclosed below in FIG. 5, so long as the operator holds the control stationary.

In one embodiment feedback arm 402 moves over a very short arc before it is mechanically stopped. Further attempts to move control rod 410 meet resistance in the operator input subassembly in the manner disclosed below.

While the basic operation of the feedback subassembly has been disclosed using discrete components and machine elements, variations will be obvious to those skilled in the art. For example, drivers 403 and 404 are illustrated as a pair of single acting cylinders. They could be replaced by one double acting cylinder, or by a rotary actuator capable of being driven in both clockwise and counterclockwise directions. The variable orifice members may be controlled directly by feedback arm 402, eliminating shuttle arm 401 and linkage members 411 and 412. Variable orifice members may be formed from discrete components or it can be embodied in a monolithic apparatus disclosed below.

Figure 5:
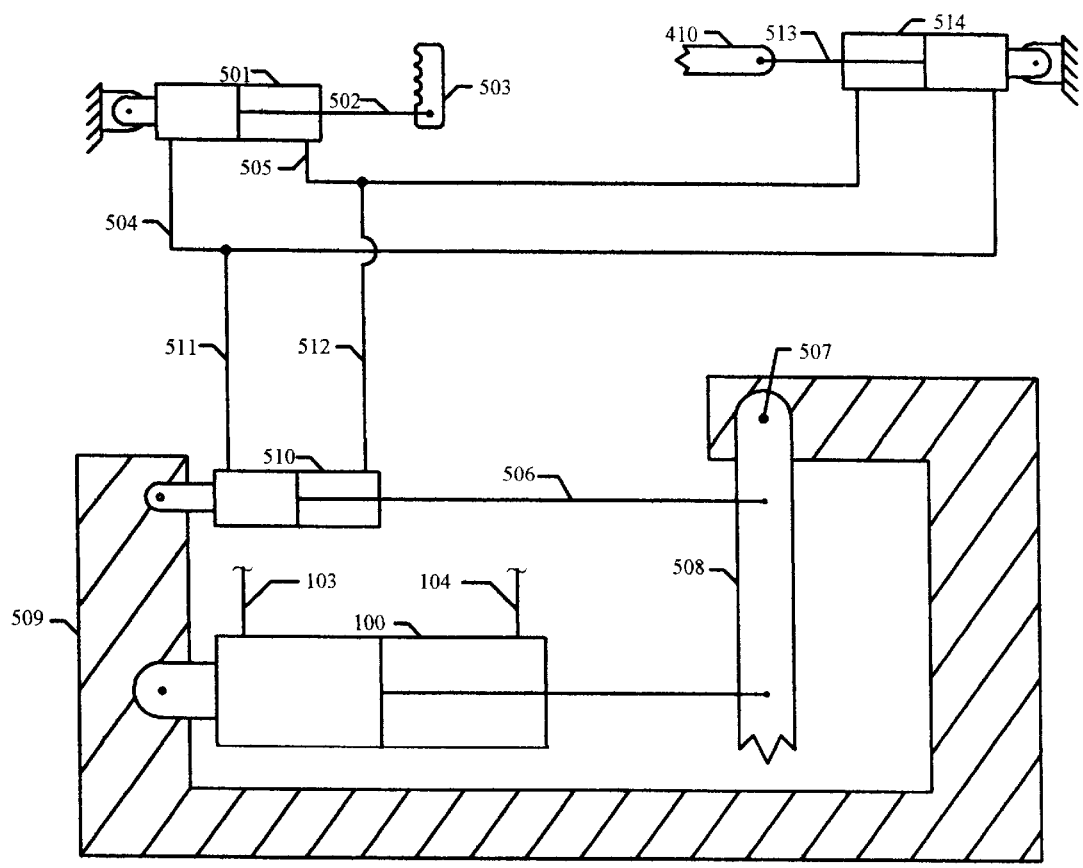
FIG. 5: A SCHEMATIC REPRESENTATION OF THE OPERATOR INPUT SUBASSEBMLY OF THE PRESENT INVENTION.

The feedback subassembly and the driver control subassembly work in conjunction with the operator input subassembly. The operator input subassembly is shown in FIG. 5, illustrated for the case of control of a single axis machine member driven by a hydraulic cylinder. Other embodiments will be readily apparent from this example.

By way of illustration, the operator input subassembly is readily adaptable for use on machines substituting any form of hydraulic driver for a cylinder and piston. Machines having a plurality of elements operating about multiple axes may be controlled using multiple iterations of the scheme outlined in FIG. 5. Multiple iterations of the elements of the operator input subassembly may be incorporated into a "single hand" control (a manipulator) having multiple degrees of freedom, as will be apparent from examples which follow.

With reference to FIG. 5, the operator input subassembly is a closed hydraulic system comprised of a double acting master cylinder 501 coupled to double acting differential cylinder 514 via conduits 504 and 505 in a typical master/slave relationship. Thus, when an operator grasps fitment 503 (illustrated as a handle, but fitments accommodating manipulation by various limbs, digits, and other anatomical features will serve as well) and displaces it, moving piston rod 502, displacing the piston in master cylinder 501, the motion is translated into like motion of piston rod 513 in differential cylinder 514. Conduits 511 and 512 connect load position feedback cylinder 510 in parallel with differential cylinder 514 via connection with conduits 504 and 505 respectively. Load position feedback cylinder 510 is fastened between frame 509 and machine member 508. Machine member 508 is moved by driver 100. Driver 100 is identical to driver 100 disclosed in FIG. 1. Load position feedback cylinder 510 moves at a proportional rate to that of machine member 508 as machine member 508 is pivoted about axis 507 by driver 100. Piston rod 513, operated by the piston of differential cylinder 514, is connected to control rod 410 which is the same as control rod 410 disclosed in FIG. 4 above.

In operation, with the system starting at rest, operator movement of master cylinder piston rod 502 expels fluid from a first chamber of master cylinder 501 and draws fluid correspondingly into a second chamber. This hydraulic fluid displacement (fluid flow) is conducted through conduit pair 504 and 505. Since load position feedback cylinder 510 is mechanically tied to driver 100 (either directly or through parallel mounting between frame 509 and machine member 508) it is essentially fixed with respect to being moved by the master cylinder 501. For this reason, the fluid expelled from the first chamber of the master cylinder 501 will flow into the like first chamber of differential cylinder 514, and a corresponding amount of fluid will be drawn into the second chamber of master cylinder 501 from the like second chamber of differential cylinder 514. In this manner, the piston of differential cylinder 514 will be displaced, moving control rod 410 in conjunction with it. As was disclosed above, starting from a neutral position, moving control rod 410 results in actuation of, with reference to FIG. 1, control valve 105, with the concomitant application of power to driver 100. This will result in the movement of the piston in load position feedback cylinder 510 via piston rod 506 which is in communication with moving machine member 508. As was disclosed above, application of hydraulic power to driver 100 results ultimately in feedback pressure being exerted against control rod 410, in a direction that attempts to return it to its starting position. If operator does not continue to exert pressure against control fitment 503, as the machine element moves concomitantly moving the piston of load position feedback cylinder 510, the fluid movement in conduit pair 505 and 504 will be directed to differential cylinder 514, returning piston 513 to its initial position and consequently returning control rod 410 to its initial position. As long as the operator maintains effort against control fitment 503 the fluid movement initiated by feedback cylinder 510 will be conducted through conduit pair 504 and 505 to master cylinder 501, permitting piston rod 502 to move in a direction and at a rate proportional to the movement of machine member 508 whilst piston rod 513 of the differential cylinder remains in its displaced position. The effort which must be exerted against fitment 503 to maintain power to actuator 100 is dependent upon the relative forces exerted against control 410 by the feedback mechanism disclosed above and the differential cylinder 514 in response to the operators efforts against fitment 503.

As the hydraulic pressure increases to driver 100, as disclosed above, the back pressure ultimately increases against control rod 410 by way of, with reference to FIG. 4, feedback drivers 403 or 404 acting against feedback arm 402. The increased pressure against differential cylinder 514 acts to force differential cylinder 514 back to its starting position faster than the load position cylinder 510 can accommodate the accompanying fluid motion through conduit pair 504 and 505. As this happens, assuming piston rod 502 is held in place by the operator, the pressure differential between conduits 504 and 505 rises, exerting greater pressure back against control fitment 503 and the operators hand (or any other anatomical feature used to actuate a fitment 503).

As machine member 508 reaches a position desired by the operator, and the operator exerts sufficient force to maintain control fitment 503 in place, the pressure differential between conduits 504 and 505 is reduced until the operator feels only the back pressure attributable to the force of the static load acting against actuator 100 through machine member 508. This force will again increase proportional to the forces generated in actuator 100 in moving machine member 508 to a new position if the operator moves the control fitment again in either direction. The control fitment 503 will remain in its displaced position without further actuating driver 100 as long as the operator exerts sufficient force to "hold" machine member 508 in place. Movement of the control fitment again by the operator will again actuate the hydraulic circuit supplying power to actuator 100. Thus, used with the feedback and driver control subassemblies disclosed above, the operator input subassembly gives an operator a means to control a hydraulically operated machine element while providing tactile feedback of the force with which the machine is operating and the position of the machine element. In the present invention, because the feedback system is constantly supplied with fluid from the action of a static load acting against a machine member, some degree of force will be required on the part of the operator to hold a load static. Additionally, even though the system will permit slight movement of the control fitments before the machine member driver is active, the design of the feedback system supplies "effort" feedback with even slight motion of the control fitments, precluding overrunning (feed forward operation) the position of a machine member with a control fitment.

In some embodiments, a spring tension may be applied to the master cylinder, its piston rod 502 or its control knob 503 in a direction and to a degree necessary to balance out the forces exerted by a load against the system. In such an embodiment, when a machine member is supporting a load, the operator does not have to exert a balancing force against the control to maintain a load in a static position. Such a spring tension biasing device is well known to those skilled in the art.

One skilled in the art will appreciate that the hydraulic system of the operator input subassembly can be operated as an independent hydraulic system separated from a hydraulic system used to supply hydraulic power to a machine member being controlled by the present invention. Although disclosed below is a scheme to charge both systems from a common hydraulic fluid source and pump system, it is entirely within the scope of the present invention to arrange the components of the operator input system so that they utilize a separate hydraulic fluid charging system and operate independently of any other hydraulic system. In this manner, a hydraulic system powering machine members can be operated on one type of working fluid and the hydraulic system of an operator input subassembly can be operated on an entirely different, even incompatible, working fluid. By way of practical example, in this manner the system moving machine elements could be charged with a high viscosity working fluid that would permit, e.g. operation of that system at very high load pressure without leaks, while the operator input subassebly hydraulic system could be operated on much lower viscosity fluid that would permit, e.g. a high degree of "feel" in the operator controls. Other advantages will be readily apparent to one skilled in the art.

Below will be discussed an embodiment of the principles disclosed above. The relationship between the pressure of the hydraulic fluid applied to a machine member driver to move a load and the pressure which appears in the shunt conduits of the feed back circuit is determined in a given configuration of hydraulic components and by the resistance to fluid flow imposed by orifices 129, 130, 131, and 132. One way to express this relationship has been developed by the Lee Company. In their conception of the matter, resistance to fluid flow can be expressed in units of "liquid Ohms" termed LOHMS. An LOHM, which is expressed in units of $[\text{min.}\cdot\text{pounds}^{0.5}\cdot(\text{gal.}\cdot\text{in.})^{-1}]$. Practically, the definition of LOHM is that fluid resistance required to limit the flow of water under a head pressure of 25 pounds per square inch at a temperature of 80 degrees Fahrenheit to a rate of 100 gallons/minute. The relationship between flow and resistance to flow is given by:

$$\sqrt{\text{Pressure drop/LOHMS}^{2\times 400}} = \text{flow rate}$$

such that for a given pressure drop, as flow resistance is increased, the flow rate drops as the square of the resistance increase. This can be rearranged to give the pressure drop as a function of LOHMS for a given flow rate as follows:

$$\text{Pressure Drop} = (\text{Flow Rate})^2 \times \text{LOHMS}^2/400$$

For a given arrangement of elements pertinent to the present invention, this complexity may be reduced to an expression in which the relationship between working pressure present in the hydraulic circuit and the hydraulic pressure appearing in the shunt conduit can be expressed as the pressure drop across two orifice members in a series, expressed as:

$$P_s = P_t/1 + (L_2/L_1)^2$$

where (with reference to FIG. 1) $P_t$ is the pressure in a hydraulic driver circuit conduit 110, $P_s$ is a pressure in a shunt conduit (125 or 126), $L_2$ is the value (in LOHMS) of the resistance of an orifice member in the drain side of a shunt conduit (orifice members 131 or 132) and $L_1$ is the value in LOHMS of an orifice member in the supply side of a shunt conduit (orifice members 129 or 130).

Figure 2:
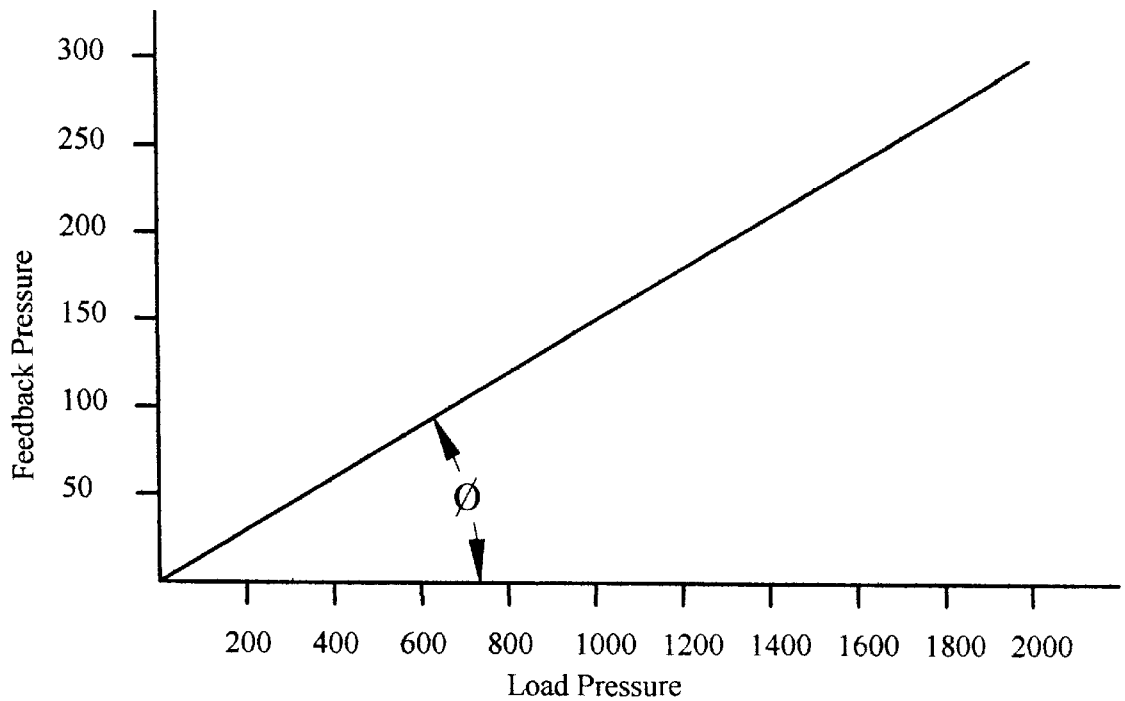
FIG. 2: THE LOAD PRESSURE/FEEDBACK PRESSURE RELATIONSHIP REALIZED USING ONE MODE OF PRACTICING THE PRESENT INVENTION.

The fundamental embodiment of the invention disclosed above yields an apparatus in which the relationship between feedback pressure and load pressure is linear over the entire operating range of the apparatus. Modifications of this basic design is possible in which other relationships between load pressure and feedback pressure are possible. With reference to FIG. 2, the linear relationship between load pressure and feedback pressure is graphically presented. The slope (φ) of the relationship between load pressure and feedback pressure may be increased for higher sensitivity, which means high feedback pressure to overcome at high load pressures, or lowered to reduce operator fatigue (produces lower feedback pressure for high load pressures), which means a system which exhibits less operator "feel" at low load pressures. For operations where load pressures cover a such a broad range that a linear relationship between load pressure and feedback pressure yields either unacceptably low sensitivity at low load pressures or unacceptably high effort at high load pressures, a dual slope relationship between load pressures and feedback pressure is preferable. Such a relationship is displayed in FIG. 3.

Figure 3:
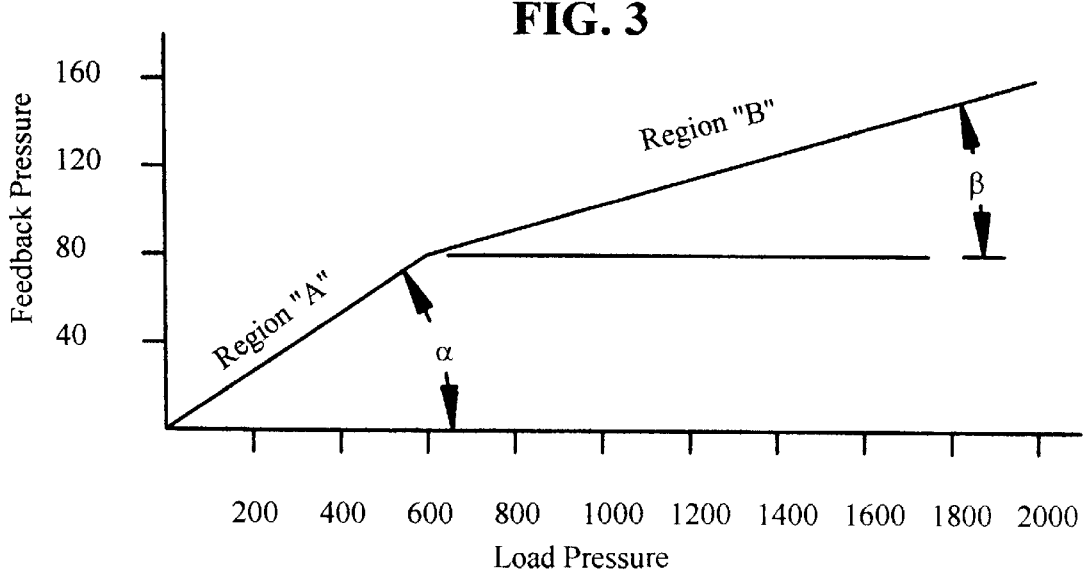
FIG. 3: THE LOAD PRESSURE/FEEDBACK PRESSURE RELATIONSHIP REALIZED USING A SECOND MODE OF PRACTICING THE PRESENT INVENTION.

With reference to FIG. 3, an arbitrary relationship, region "A" of the load/feedback pressure curve occurs at load pressures of up to 600 lbs. and is shown with a slope α. Load pressures within this region produce a feedback pressure which in this example is 13% of the load pressure. This permits a high degree of operator "feel" in the controls, permitting very precise regulation of the force applied by the machine under control. A "knee" in the curve of this example occurs at load pressures of about 600 lbs. In the "B" region of the example the load/feedback pressure curve displays a liner relationship where feedback pressure is reduced to about 6% of load pressure. This region has a slope of β, wherein β<<α. Operation of the apparatus in region "B" exhibits reduced operator sensitivity to load pressures but permits operators to manipulate much higher load pressures than are possible operating in the 13% feedback relationship of region "A". A load/feedback pressure curve displaying this "knee" type of response can be achieved with some modification of the driver control subassembly.

With reference to FIG. 1, a "knee" can be created in the load pressure/feedback pressure relationship by the installation of conduits 135 and 136 between reservoir 109 and conduits 125 and 126 respectively at a point in the same region in which shunt conduits 127 and 128 respectively are connected. Interposed in conduit 135 is pressure relief member 133, and interposed in conduit 136 is pressure relief member 134. Above a certain pressure, the pressure relief members will open providing additional orifice area for draining a corresponding hydraulic fluid sampling conduit, thereby reducing the relative pressure transmitted by an associated shunt conduit (127 or 128) to the feedback subassembly. The slope of the low sensitivity region of operation thus created (high load pressure region "B" of FIG. 3) is established by a number of factors such as the pressure at which the pressure relief member opens, the additional orifice area provided by the opened pressure relief member, and the spring rate chosen to operate the valve stem in the pressure relief member. In the present invention, for a given arrangement of conduits and other elements, the slope can be adjusted most conveniently by selecting the ratio of the orifice area of the orifice member supplying pressure to a given hydraulic fluid sampling conduit to the sum of the orifice areas of orifice members draining that conduit. Thus, the magnitude of feedback pressure appearing in the shunt conduit 127 relative to the load pressure being applied to driver 100 when moving load 102 under piston extension of driver 100 can be altered by changing the ratio of fixed orifice 129 to the sum of orifice area in pressure relief member 133 and fixed orifice member 131 when the shunt conduit is operated at pressures sufficient to open pressure relief member 133.

In the same manner, the magnitude of feedback pressure appearing in the shunt conduit 128 relative to the load pressure being applied to driver 100 when moving load 102 under piston retraction of driver 100 can be altered by changing the ratio of fixed orifice 130 to the sum of the orifice area in pressure relief member 134 and fixed orifice member 132, again when the pressure in the shunt conduit is sufficient to operate pressure relief member 134.

These two ratios of the orifice members in the extension and retraction feedback circuits would not have to be equal, and in some applications it might be desirable to set the ratios to give two different feedback relationships for retraction and extension movements of the load.

The point at which the "knee" in the load/feedback pressure curve occurs, that is the pressure at which the apparatus operates in, with reference to FIG. 3, region "A" or region "B", is determined by the pressure at which a given pressure relief device commences operation. Thus, the higher of an opening pressure selected for pressure relief members 133 and 134, the higher the load pressure at which the feedback system will switch from, with reference to FIG. 3, the high effort/high sensitivity region "A" to the low effort/low sensitivity region "B".

Pressure relief members 134 and 133 may be conventional mechanical pressure relief valves such as a Lee Company PCRM5520™, which is available as a unit having a fixed operating pressure. Other units are well known to those skilled in the art which have an adjustable operating pressure such as Parker RDH081™ series valves. Additionally, pressure relief members which are electrically actuated in response to a signal from a pressure sensor are also well known to those skilled in the art. Use of electrically detected operating pressure also permits the system to be operated under dynamic control, permitting the pressure at which the "knee point" occurs to be adjusted during operation of the machine, such as will be familiar to those skilled in the art.

It will be apparent to those skilled in the art that a series of knees may be introduced into the load/feedback pressure relationship by introducing additional pressure relief devices in parallel with each of conduits 136 and 135, arranged so that each pressure relief device added opens at a different pressure. The same relationship between a load pressure and a feedback pressure would exist in such a system as was detailed above for a system with a simple mechanical pressure relief valve. The relationship could use the same principle, ratio of the sum of the areas of all of the orifice members in these additional pressure relief devices to the supply orifice to control the slope of the relationship, as was disclosed above for the case with one supply orifice and one drain orifice.

It will be apparent to those skilled in the art that alternative devices may equally well employed to give load/feedback pressure curves which are not linear, thus, for example, a throttle plate which progressively opens as load pressure increases will yield a curved relationship between load and feedback pressures such that over its whole operating range, as load pressure increases the operator gets progressively less sensitivity and lower relative effort in manipulating the input device. This concept is equally well embodied if, for example, fixed orifice members 131 and 132 are substituted with members having a dynamically variable orifice, such as is known to those skilled in the art.

In some applications, the preferred embodiment disclosed above yields an apparatus wherein the fluid bleed through orifices 119, 120, 123, and 124 is unacceptably high, leading to pumping losses which require a hydraulic pump 106 of higher than desired capacity. In this situation, pumping losses may be reduced by interposing orifice member 137 in conduit 118.

Orifice member 137 may have a fixed or adjustable orifice opening. Installation of orifice member 137 permits the use of smaller orifice members 119, 120, 123, and 124 than could otherwise be employed, resulting in lower volumes of fluid being passed through conduits 121 and 122 and back into reservoir 109. While the pumping losses are decreased in this manner, for a given driver operator system consequently a lower volume of fluid will be passed into the driver operator system. One result of the lower fluid volume is that the system response to changes in pressure in the actuator will be slower because it will take more time to establish pressure changes in the power control subassembly.

Figure 6:
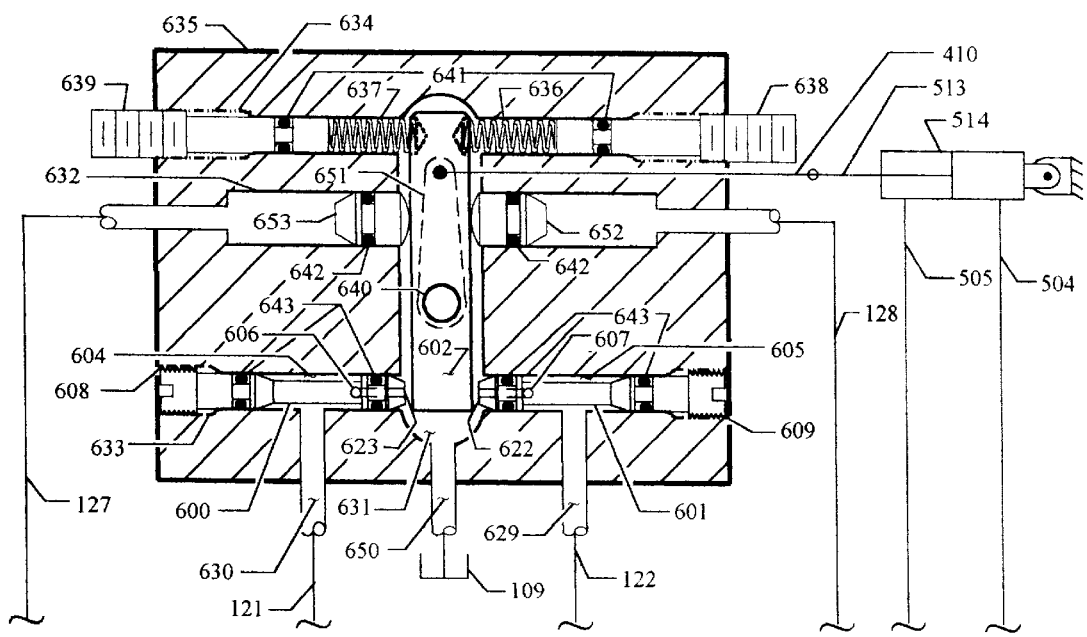
FIG. 6: A CUTAWAY VIEW OF THE BEST MODE OF PRACTICING THE FEEDBACK SUBASSEMBLY OF THE PRESENT INVENTION.

An alternative mode of practicing the feedback subassembly utilizing the concepts disclosed above is best understood with understood with reference to FIG. 6. FIG. 6 is a cutaway view of a monolithic feedback subassembly. With reference to FIG. 6, machine block 635 contains lateral through bored passageways 634, 633, and 632. Machine block 635 also contains passages laterally blind bored in a perpendicular face. Thus, passageways 629 and 630 are bored in such a manner that they form a perpendicular intersect with passageway 633. Blind bored passageway 631, disposed centered between passageways 629 and 630, is bored to sufficient depth that it forms a perpendicular intersect with passageways 632, 633, and 634.

The opening of passageway 634 on either lateral face of block 635 is finished to accept screw adjusters 638 and 639. Screw adjusters 638 and 639 carry spring members 636 and 637 respectively. When the feedback subassembly is assembled, the screw adjusters are operated so that spring members 636 and 637 impinge on feedback arm 602 with equal force. Feedback arm 602 pivots on axis shaft 640 such that when spring members 637 and 636 impinge on it with equal force feedback arm 602 resides centered between orifice 623 and 622. Feedback arm 602 performs the same function as, with reference to FIG. 4, feedback arm 402. Screw adjusters 638 and 639 may be fitted with o-ring seals 641 to insure a fluid-tight assembly.

While feedback arm 602 is shown in FIG. 6 to be pivotally attached within block 635, one skilled in the art will appreciate that it may with equal effect be a sliding member. In such a construction, a feedback arm comprising a sliding control member instead of a pivoting control member could be imposed within bore 632 of block 635, dimensioned of suitable length to permit the placement of pistons 652 and 653 at either end. A structure appended to the middle of such a control member would be arranged to reside between orifice members 622 and 623. Movement of such a control member along bore 632 would effect the same action in the driver operator circuit as disclosed above as the appended structure approached the face of one orifice member and retreated from the face of the other. Other equally effective embodiments of this feature will be obvious to one skilled in the art and are within the scope contemplated for the present invention.

With further reference to FIG. 6, passageway 632 has a surface finish suitable to function as a cylinder wall, and receives pistons 652 and 653. Pistons 652 and 653 may be fitted with o-rings 642 to insure a fluid tight seal. In practice, the lateral face openings of passageway 632 are provided with a suitable fitting to effect attachment of conduits 127 and 128 to the openings. Examples of such an arrangement are, but are not limited to, a threaded opening fitted with a Swagelock™ tubing connector and a flange fitting, one flange half being machined into the lateral face of machine block 635. Any means of connecting hydraulic tubing to a port in a block, such as is well known in the art, is readily adapted to effecting this connection. In this construction, pistons 653 and 652 serve the same function as, with reference to FIG. 4, piston and rod 409 and 408 respectively. Because of the length of pistons 653 and 652, and because of the close proximity of feedback arm 602 to these pistons, no piston rod is needed in this construction. Pistons 653 and 652 can impinge on feedback arm 602 directly. For this reason the impinging face of pistons 652 and 653 are rounded to facilitate free movement of the contact area between the pistons and the feedback arm. Other face shapes imparted to pistons 652 and 653 can be made to function equally well with or without concomitant adjustment of the contact point on feedback arm 602 and still be within an embodiment contemplated by the present invention, such as would be obvious to one skilled in the art.

With further reference to FIG. 6, openings 608 and 609 of passageway 633 on both lateral faces of machine block 635 are machined to accept a threaded members 600 and 601, which carry orifice members 623 and 622 respectively. Threaded member 600 is machined to permit fluid introduced into opening 630 to pass through the annular space 604, thence through conduit 606, and thence through orifice member 623, and thence through passageway 631 and out of block 635 via conduit 650. Threaded member 601 is machined to permit fluid introduced into opening 629 to pass through the annular space 605, thence through conduit 607, and thence through orifice member 622, and thence through passageway 631 and out of block 635 via conduit 650. The location of orifice members 623 and 622 relative to feedback arm 602 may be adjusted by running threaded members 600 and 601 respectively into or out of threaded portion 608 and 609 respectively of passageway 633.

In one embodiment, orifice members are adjusted to reside 0.0015" from a face of feedback arm 602. In this position orifice members 622 and 623 act as mechanical stops for control arm 602, as well as acting as variable orifice members in the manner disclosed above. In such an embodiment, a fitment translating operator motion to input in the operator input subassembly would move only slightly, perhaps even being inperceptible to the operator, before the feedback arm made contact with an orifice member and was no longer capable of being displaced in space using ordinary effort. In such a case, the force applied against the control arm by the feedback pistons 652 and 653 will be manifest as a need to continue to exert an equalizing force against the fitment. If such a force is not exerted, the feedback arm is free to return to its neutral position and discontinue the application of hydraulic power to the associated driver in the manner described elsewhere in this specification. Because of the design of the operator input subassembly, disclosed elsewhere in this document, while maintaining a force against the fitment, the operator would also feel the fitment move in a direction dependant on the direction of the operator applied force and at rate proportional to that of the associated machine member under the control of the operator.

Threaded members 600 and 601 may be fitted with o-ring seals 643 to provide a fluid tight assembly. Such an assembly provides for higher operating pressures by insuring that fluid passed into conduit 629 or 630 passes through orifice members 622 or 623 respectively rather than leaking around the orifice member or past the threaded portions of passageway 633.

In normal operation, with the feedback arm centered and the system at rest, orifice members 623 and 622 are adjusted to reside equidistant from feedback arm 602. In this configuration, as feedback arm 602 is rotated clockwise on pivot axis 640 it can impinge orifice member 623. Counterclockwise rotation of feedback arm 602 on axis 640 permits the feedback arm to impinge orifice member 622. The face of feedback arm 602 contacting the orifice members is machined such that the approach of the feedback arm reduces the effective area of the orifice impinged as the feedback arm approaches it. In like manner, when feedback arm 602 recedes from a given orifice member, it increases the effective orifice area of that orifice. In this manner the assembly of feedback arm 602, pivot axis 640, passageway 631 and orifice members 623 and 622 functions in the same manner as, with reference to FIG. 4, feedback arm 402, pivot 413, and variable orifice members 123 and 124. Shuttle rod 401 and connecting rods 411 and 412 are not needed in this mode of practicing the invention, as the feedback arm 602 directly varies the opening of the orifice members when it is moved.

Comparison of the operation of the feedback subassembly disclosed in FIG. 4 with the feedback assembly disclosed in FIG. 6 is readily made with the placement of conduit pairs 127 and 128, which are shown connected to the left and right opening respectively of passageway 632. In one embodiment, control rod 410 passes into machine block 635 through a passageway (not shown) and is connected directly to feedback arm 602. Alternatively, as shown in FIG. 6, control arm 410 is connected to lever 651 which is external to machine block 635 (shown in shadow illustration). External lever 651 and feedback arm 602 are both fixed to pivot shaft 640 such that movement of lever 651 is translated through pivot shaft 640 in like degree to feedback arm 602. Conduit 121, which is shown connected to passageway 630, and conduit 122 which is shown connected to passageway 629, functional identically to conduits 121 and 122 disclosed in FIG. 1. Conduits 127 and 128 shown connected to either end of passageway 632 in FIG. 6 terminate at their other end in the same manner as like numbered conduits disclosed for FIG. 1 above. Control rod 410 in FIG. 6 performs the identical function as the same numbered control rod disclosed with reference to FIG. 4.

In the same manner as described for the embodiment of the present invention disclosed in FIG. 4, with reference to FIG. 6, when control rod 410 is moved, it causes feedback arm 602 to move, reducing the effective opening of one orifice and concomitantly increasing the effective opening of the other orifice in the pair of orifice members 622/623. In the conduit pair 121/122, this causes pressure to rise in the one conduit of the pair that is connected to the orifice with a reduced effective opening and to drop in the orifice with increased effective opening. This pressure differential operates the associated control valve, for example, with reference to FIG. 1, control valve 105, as detailed above. As disclosed in conjunction with the disclosure of the FIG. 4 feedback subassembly, operation of the control valve (applying hydraulic power to the machine member driver) causes a pressure differential between conduits 127 and 128. This pressure differential causes opposed pistons 652 and 653 to move in such a manner that they tend to restore feedback arm 602 to its neutral position. Restoring feedback arm 602 to its neutral position equalizes the effective orifice area in orifice members 622 and 623. As with other embodiments, this leads to a reduction in the pressure differential between conduits 121 and 122 to near zero. Reduction of the pressure differential between conduits 121 and 122 returns the valve supplying hydraulic pressure (eg, with reference to FIG. 1, valve 105) to its neutral position, discontinuing hydraulic power to an associated machine member actuator. In this manner the feedback subassembly disclosed in FIG. 6 functions in all respects to that disclosed in FIG. 4.

Figure 7:
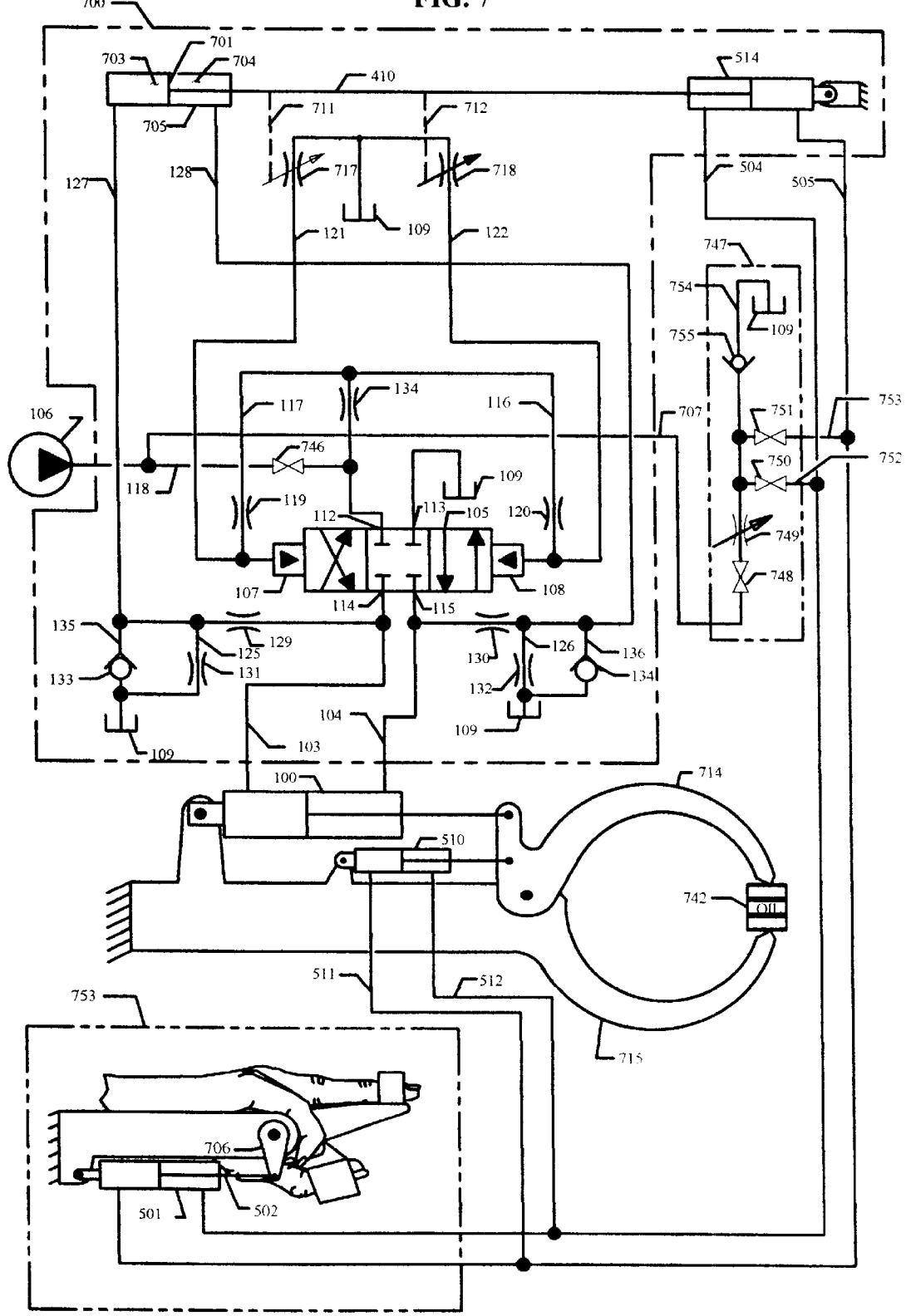
FIG. 7: A SCHEMATIC REPRESENTATION OF THE INTEGRATION OF THE FEEDBACK SUBASSEMBLY, DIRECTIONAL CONTROL VALVE DRIVER SUBASSEMBLY, AND OPERATOR INPUT SUBASSEMBLY IN A SINGLE AXIS MACHINE.

FIG. 7 is a schematic diagram of a single axis machine controlled by the present invention. With reference to FIG. 7, the integration of the driver control subassembly, feedback subassembly and operator input subassembly as disclosed in FIGS. 1, 4, and 5 respectively is illustrated. The feedback subassembly is shown using double acting driver 705, which is shown as a hydraulic cylinder and piston, but may equally well be substituted by any type of double acting hydraulic driver, or a pair of single acting hydraulic drivers mounted on a common machine element so that their driving action is in mutual opposition. Double acting driver 705 substitutes for, with reference to FIG. 4, a pair of single acting drivers 403 and 404 represented there schematically as cylinder and piston drivers. In hydraulic driver 705, piston 701 functions identically to the combination of, with reference to FIG. 4, pistons 409 and 408, while chambers 703 and 704 functionally replace the individual chambers in drivers 403 and 404.

With further reference to FIG. 7, the coupling between variable orifice members 717 and 718 is conceptually shown by dotted lines 711 and 712. These are a schematic representation of any type of mechanical coupling between driver 705 and any type of variable orifice disclosed above, such that orifice members 717 and 718 are opened and closed in opposition to each other. Thus the combination of driver 705, input rod 410, and mechanical couples 711 and 712 is the functional equivalent to, with reference to FIG. 4, feedback arm 402, shuttle arm 401, coupling arms 411 and 412 and drivers 403 and 404. Additionally, it is the functional equivalent of, with reference to FIG. 6, feedback arm 602, pistons 652 and 653 residing within passageway 632, control rod 410 and orifice members 622 and 623. In FIG. 7, all components are numbered equivalently with like components disclosed elsewhere.

With further reference to FIG. 7, it can be seen that when an operator moves control 706 (shown as a lever) it moves piston rod 502 in master cylinder 501. Fluid is expelled from one chamber of the master cylinder and drawn into the other chamber of the master cylinder through conduit pair 504 and 505, producing like motion in differential cylinder 514. Since load position feedback cylinder 510, which is connected hydraulically in parallel to cylinder 514, is fixed in place by driver 100, the displacement of the piston of differential cylinder 514 is transferred via control rod 410 to variable orifice members 717 and 718 and to feedback driver 705. The change in relative openings of variable orifice members 717 and 718 creates a pressure differential in conduit pair 121 and 122, which in turn causes the pilot cylinder in control valve 105 to shift from its neutral position. This shift in the pilot cylinder of control valve 105 causes hydraulic power to be directed to driver 100. Application of power to the driver causes a pressure differential between conduits 127 and 128, whereupon feedback piston 701 moves in the opposite direction that control rod 410 was moved by operator input, returning control rod 410 to its initial position, and reducing the pressure differential between conduit pair 121 and 122 to zero in the manner disclosed above. The leveling of the pressure differential between conduit pair 121 and 122 returns the pilot cylinder of control valve 105 to its neutral position, shutting off hydraulic power to driver 100.

In the interim, the hydraulic power applied to driver 100 has moved machine member 714, which is equivalent in functionality to, with reference to FIG. 5, machine member 508, to a new position. Movement of machine member 714 displaces the piston of load position feedback cylinder 510. This displacement causes fluid to be expelled from one chamber of load position feedback cylinder 510 and drawn into the other chamber. This fluid movement is communicated to master cylinder 501 and differential cylinder 514 via conduits 511 and 512, which are connected to conduits 505 and 504 respectively. If the operator attempts to move lever 706 at a rate that exceeds the movement of load position feedback cylinder 510, the increased rate of fluid movement through conduits 504 and 505 will be resisted. The resistance to operator movement of the manipulator will rise until the operator can move the lever no further, effectively limiting the operator to movement at a rate proportional to the rate at which machine member 714 is moving. If load 742 prevents machine member 714 from moving, the action of feedback driver 705 working against the motion of differential cylinder 514 causes the feedback pressure communicated through conduit pair 504 or 505 to rise as the operator continues to hold the input lever in place. Finally, if the driver inputs a motion and holds the lever in place, rather than continuing to exert pressure against the manipulator in an attempt to move the fitment, as a machine member 714 moves to a position which returns the differential cylinder and feedback assembly to its neutral position, the back pressure exerted against the operator is reduced to a value just sufficient to hold the load in position.

Additional features of the hydraulic system are disclosed in FIG. 7. Valve 746 is interposed in conduit 118 to provide for isolation of the hydraulic pumping system and to permit operation of a charging system without risk of actuating driver 100. One embodiment of a charging system is shown in FIG. 7 as a collection of elements enclosed in an outline box labeled 747. Conduit 707 connects the output of pump 106 with charging system 747. Charging system 747 comprises shut off valve 748, variable orifice 749, return conduit 754, charging conduits 752 and 753, and shut off valves 750 and 751 interposed in charging conduits 752 and 753 respectively. Charging system 747 may also be employed to adjust the relative position of the operator input lever 706 and machine element 714.

To use charging system 747, shut off valve 746 is closed, shutoff valve 748 is opened, pump 106 is started and variable orifice 749 is set to give a small rate of fluid bleed through conduit 754 and into reservoir 109. This fluid bleed will serve to carry away air bubbles that may be expelled from cylinders 501, 510, or 514 into conduit 754 during the bleeding operation disclosed below. Valves 750 and 751 are next opened permitting conduits 504 and 505 to communicate with conduit 754 through conduits 752 and 753 respectively. Manipulation of the various miniature cylinders comprising master cylinder 501, differential cylinder 514 and load position cylinder 510 expels gas residing within the hydraulic system into conduit 754, and draws hydraulic fluid from conduit 754. These cylinders may be manipulated by disconnecting the mechanical coupling of the piston rod and manually stroking it in and out. Alternatively, a downstream orifice member may be added to conduit 754 ahead of the reservoir to create a fluid pressure in conduit 754. Bleed fittings could be added to the various hydraulic drivers, with a combination of manipulation and bleeding procedures being employed to expel air from the system and charge it with hydraulic fluid. Additionally, check valve 755 could be added to conduit 754 upstream of reservoir 109, which would allow fluid to flow from the system but prevent air from being drawn back into the system from the reservoir. Other schemes for charging and bleeding the system of the present invention will be obvious to one skilled in the art, and are within the scope of the present invention.

The present invention is also useful when employed to control multiple axis machine movement with a manipulator (control apparatus having fitments designed to translate movement of an anatomical feature of an operator into command input to the machine) designed for single limb manipulation. An example of such a machine and control device is disclosed with reference to FIGS. 8, 9, and 10.

Figure 8:
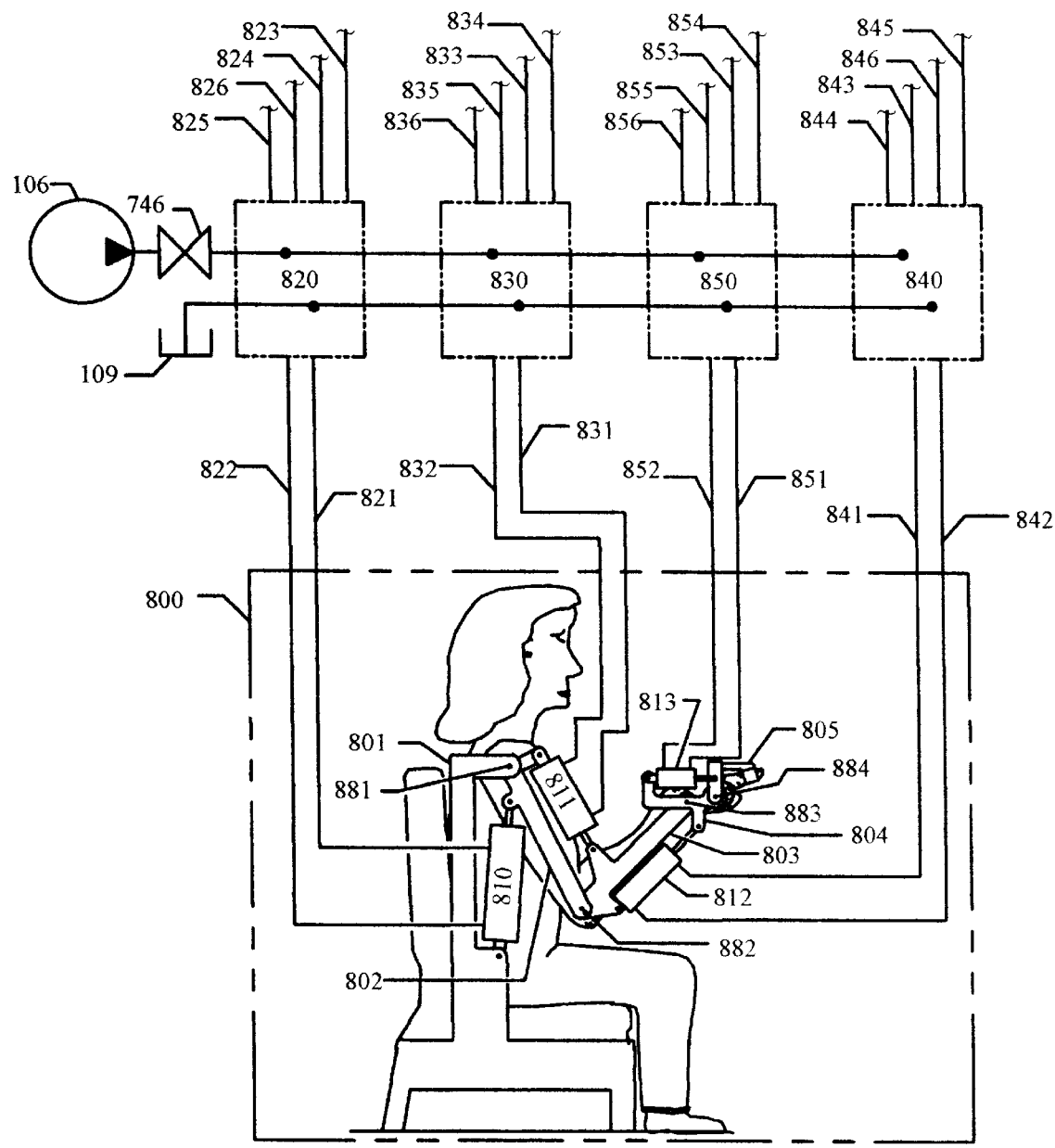
FIG. 8: AN ELEVATION VIEW OF A MULTIPLE AXIS MANIPULATOR OPERATING CONTROL/FEEDBACK MODULES ACCORDING TO THE PRESENT INVENTION.

With reference to FIG. 8, a manipulator for a machine having members pivoting about four axes is disclosed. The manipulator has members controlled by the upper arm, forearm and hand of an operator that pivot in a single plane. Appended to the member controlled by the hand of the operator is a fourth member controlled by the operator's finger that is capable of pivoting against the third member (hand controlled member). Thus the operators hand controls member 804 with flexure of the operator's wrist, whilst the operator's finger controls the movement of member 805. The three member arm and hand, and the single member digit is shown schematically in FIG. 8 as interfaced to multiple iterations of the feedback and driver control valve assemblies designated, with reference to FIG. 7, as driver control/feedback assembly 700. The manipulator disclosed in FIG. 8 comprises chair frame 801, upon which the operator sits. Pivotally attached to a convenient place of frame 801 is upper arm member 802 which pivots on axis pin 881. On the end opposite the upper arm member pivot 881, forearm member 803 is pivotally attached to upper arm member 802 by axis pin 882. On the end of forearm member 803 opposite forearm member pivot 882, hand member 804 is pivotally attached to forearm member 803 by axis pin 883. Finger member 805 is pivotally attached to hand member 804 by pivot pin 884. Hand and finger member assembly is further detailed with reference to FIG. 10.

Figure 10:
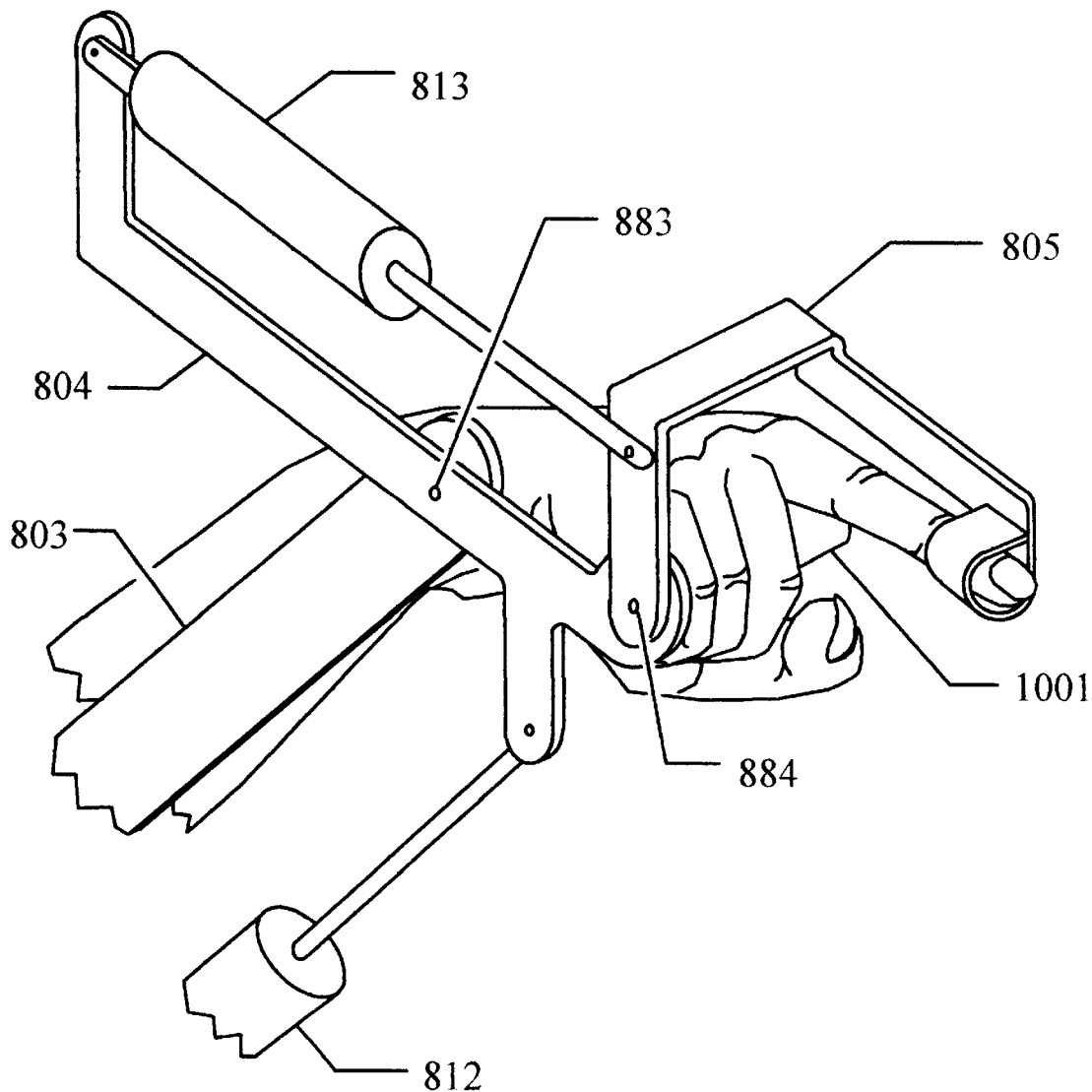
FIG. 10: A PERSPECTIVE VIEW OF AN EXAMPLE MANIPULATOR ELEMENT CONTROLLED BY THE HAND AND FINGER OF AN OPERATOR.

With reference to FIG. 10, a perspective view of a set of conjoined fitments suitable for manipulation by an operators hand and digit, hand grip 1001 affords the operator means to grip the manipulator. Hand grip 1001 is located such that it is convenient for the operator to move finger member 805 by curling an index finger inserted into finger member 805 part way about hand grip 1001. Hand grip 1001 is also located conveniently to permit the operator to move hand member 804 about axis 883 by flexing the wrist of the hand grasping hand grip 1001.

With further reference to FIG. 8, upper arm master cylinder 810 is pivotally mounted between chair frame 801 and upper arm member 802. In like manner, forearm master cylinder 811 is pivotally mounted between upper arm member 802 and forearm member 803, hand member master cylinder 812 is mounted between hand member 804 and forearm member 803. Finger member master cylinder 813 is mounted between hand member 804 and finger member 805. Members 802, 803, 804, and 805 function in like manner to, with reference to FIG. 7, lever 706. Master cylinders 810, 811, 812, and 813 function in like manner to, with reference to FIG. 7, master cylinder 501.

With further reference to FIG. 8, upper arm master cylinder 810 is connected to upper arm control/feedback module 820 by conduits 821 and 822, forearm master cylinder 811 is connected to forearm control/feedback module 830 by conduits 831 and 832, finger master cylinder 813 is connected to finger control/feedback module 850 by conduits 851 and 852, and hand master cylinder 812 is connected to control/feedback module 840 by conduits 841 and 842. Conduits 821, 831, 841, and 851 function in like manner to, with reference to FIG. 7, conduit 504. Conduits 822, 832, 842, and 852 function in like manner to, with reference to FIG. 7, conduit 505. Control/feedback modules 820, 830, 840, and 850 function in like manner as, with reference to FIG. 7, control/feedback module 700.

With further reference to FIG. 8, control/feedback module 820 delivers hydraulic power to an actuator powering a machine element corresponding to upper arm control member 802 via conduits 823 and 824, and receives input from a load position cylinder operated by such a machine element via conduits 825 and 826. In like manner control/feedback module 830 delivers hydraulic power to an actuator powering a machine element corresponding to a forearm control member 803 via conduits 833 and 834, and receives input from a load position cylinder operated by such a machine element via conduits 835 and 836. Likewise, control/feedback module 840 delivers hydraulic power to an actuator powering a machine element corresponding to hand control member 804 via conduits 843 and 844, and receives input from a load position cylinder operated by such a machine element via conduits 845 and 846. And as well, control/feedback module 850 delivers hydraulic power to an actuator powering a machine element corresponding to finger member 805 via conduits 853 and 854, and receives input from a load position cylinder operated by such a machine element via conduits 855 and 856. The details of these machine members, hydraulic drivers and load position feedback cylinders are disclosed with reference to FIG. 9. The details of the attachment of master cylinders for hand member 804 and finger member 805 fitments are also disclosed in FIG. 10 with like feature numbers corresponding to those same features disclosed in FIG. 8. It will be appreciated by one skilled in the art that hand member 804 and finger member 805 could share a common pivot pin instead of separate pivot pins 883 and 884, and function identically. Other arrangements of mechanical members and master cylinders will be appreciated by one skilled in the art to be equally as effective as those disclosed above and not depart from the claimed scope of the invention. As well, it will be appreciated from the foregoing discussion that numerous modifications are possible to fitments of an operator input subassembly (manipulator) operating in conjunction with the various anatomical features of an operator without departing from the scope of the present invention.

Figure 9:
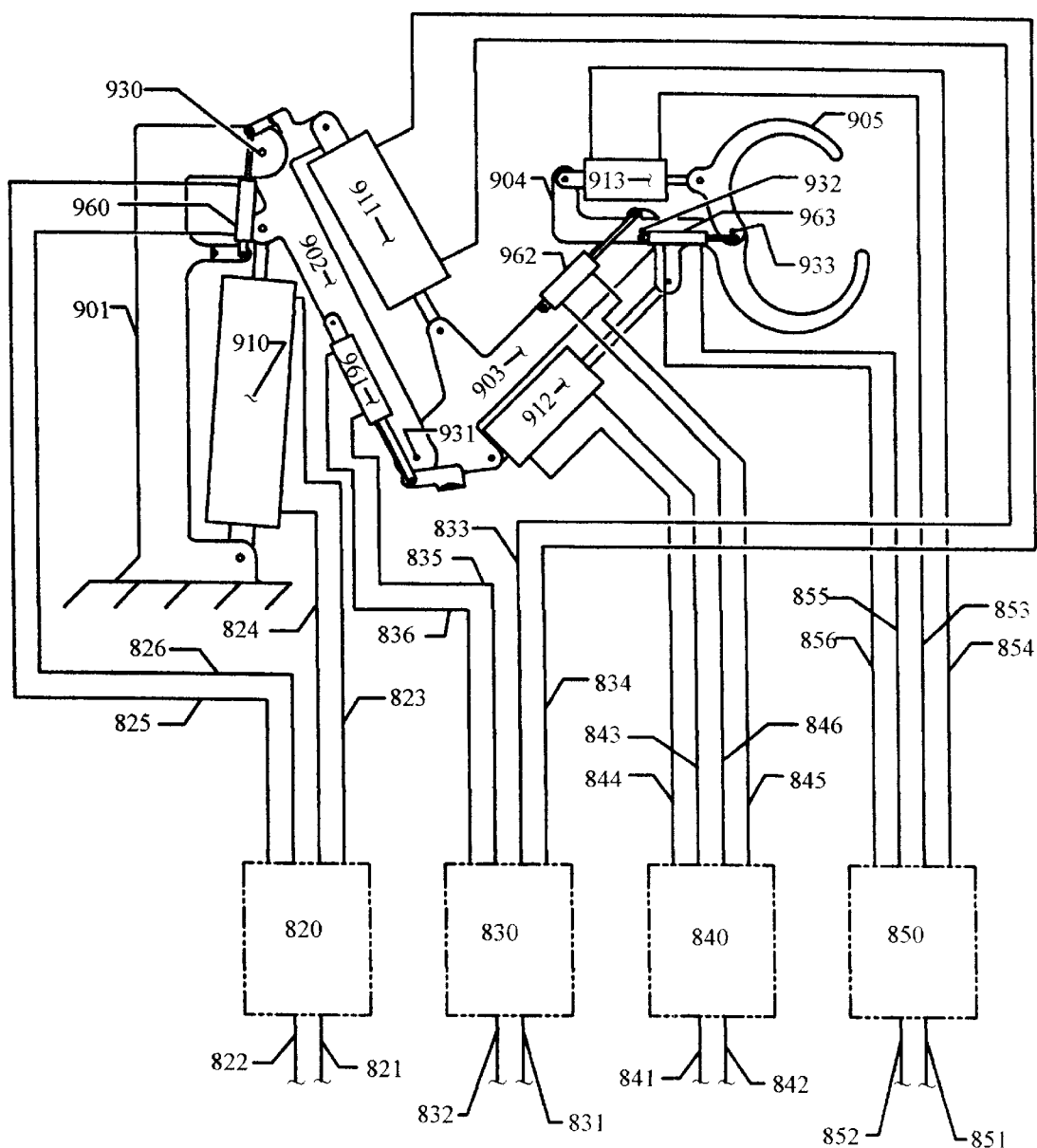
FIG. 9: AN ELEVATION VIEW OF A MULTIPLE AXIS MACHINE CONTROLLED BY THE MANIPULATOR OF FIG. 8.

With reference to FIG. 9, a hydraulic driver powered arm having three jointed members pivoting in a single plane and a finger member which can grip objects between the third jointed member and itself is disclosed in an elevation view. The arm comprise frame member 901, upper machine arm 902, which is pivotally attached by pivot pin 930 to frame member 901. Attached to upper machine arm 902 at the end opposite from the attachment by pivot pin 930 is machine forearm 903, which is attached to upper machine arm 902 by pivot pin 931. Machine hand member 904 is attached to machine forearm 903 using pivot pin 932 at the end opposite to the end of forearm 903 that is attached to machine upper arm 902. Machine finger member 905 is attached to machine hand member 904 by pivot pin 933 at a point to permit the tips of machine hand member 904 and machine finger member 905 to make contact when driven together by driver 913.

With further reference to FIG. 9, driver 910 is pivotally connected between frame member 901 and machine upper arm member 902, driver 911 is connected between machine upper arm member 902 and machine forearm member 903, driver 912 is connected between machine forearm member 903 and machine hand member 904, and driver 913 is connected between machine hand member 904 and machine finger member 905. Drivers 910, 911, 912, and 913 are functionally equivalent to, with reference to FIG. 7, driver 100.

With further reference to FIG. 9, load position feedback cylinder 960 is pivotally connected between frame member 901 and machine upper arm member 902, load position feedback cylinder 961 is connected between machine upper arm member 902 and machine forearm member 903, load position feedback cylinder 962 is connected between machine hand member 904 and machine forearm member 903, and load position feedback cylinder 963 is connected between machine hand member 904 and machine finger member 905. Load position feedback cylinder 960, 961, 962, and 963 are functionally equivalent to, with reference to FIG. 7, load position feedback cylinder 510.

With further reference to FIG. 9, feedback/control modules 820, 830, 840, and 850, which are identical to like numbered control modules disclosed in FIG. 8, supply power to drivers 910, 911, 912, and 913 respectively via conduit pairs 823/824, 833/834, 843/844, and 853/854 respectively. Load position feedback is supplied from load position feedback cylinders 960, 961, 962, and 963 to feedback/control modules 820, 830, 840, and 850 respectively via conduit pairs 825/826, 835/836, 845/846, and 855/856 respectively.

With reference to FIG. 8, an operator seated in chair frame 801 with the manipulator arm in communication with the operator's arm provides the various control/feedback modules with input by bending and extending the arm in natural motion and gripping the hand and finger fitments together in natural motion. The control/feedback modules then process this input as disclosed above, sending out hydraulic power to, with reference to FIG. 9, hydraulic drivers 910, 911, 912, and 913. This results in the machine arm duplicating the operators motion, with concomitant feedback to the operator of the proportional load the arm encounters in executing the motions input by the operator.

It will be obvious to one skilled in the art that manipulators of many types can be usefully produced using the above disclosed principles. Multiple axis manipulators can be affixed to any limb or extremity, or combination of limbs and/or extremities to provide machines with motion that mimics natural motion up to the full range of motion available to human limbs and digits. Nor are these principles limited to human extremities, any movable human anatomical feature could be connected to a properly designed fitment, such as will be appreciated by one skilled in the art, to operate a manipulator based on the principles disclosed here within. Additionally, it will be appreciated that a manipulator could be designed which can be controlled by animals other than humans.

Nor is the present invention limited to force and distance multiplication, it is conceivable that these same principles may be employed to provide manipulators which move machines operating at fractions of the power of a human being and at micro distances, providing a method of making very precise and delicate manipulations using human scale natural motions.

Although the present invention has been described with reference to preferred embodiments, numerous modifications and variations can be made and still the result will come within the scope of the invention. No limitation with respect to the specific embodiments disclosed herein is intended or should be inferred.

I claim:

1. An apparatus for controlling the movement of a hydraulically operated machine member, the apparatus comprising:
    an operator input subassembly, the operator input subassembly having at least one input fitment that can communicate with an anatomical feature of an operator, and wherein application of a force to said input fitment outputs a mechanical displacement and a first hydraulic fluid displacement, and wherein an element of the operator input subassembly has at least one member in communication with an associated moving member of a machine such that a motion of the moving member is translated into a second hydraulic fluid displacement that augments the first hydraulic fluid displacement, thereby opposing said mechanical displacement and permitting said input fitment to move in a direction of the force in concert with the movement of said machine member;
    a power control subassembly having a driver operator, a controllable hydraulic power source, said controllable hydraulic power source producing a stream of pressurized hydraulic fluid, wherein said driver operator receives the mechanical displacement imparted by the operator input subassembly, said mechanical displacement causing the power control subassembly to engage the controllable hydraulic power source directing the stream of pressurized hydraulic fluid therefrom to at least one hydraulic driver, and wherein a portion of the stream of pressurized hydraulic fluid directed to at least one hydraulic driver is diverted through at least one hydraulic fluid sampling conduit; and a feedback subassembly in communication with at least one hydraulic fluid sampling conduit of the hydraulic driver, wherein the portion of the stream of pressurized hydraulic fluid diverted through the at least one hydraulic fluid sampling conduit is used to generate a force directed opposing the mechanical displacement generated by the operator input subassembly.

2. The apparatus of claim 1, wherein the operator input subassembly comprises:

a first hydraulic cylinder assembly having a piston dividing a cylinder into two chambers and a piston rod connected to the piston such that when the piston rod is displaced hydraulic fluid is drawn into a first chamber and expelled from a second chamber causing a first hydraulic fluid displacement;

the input fitment connected to said first hydraulic cylinder assembly piston rod such that a force applied to said input fitment displaces said first hydraulic cylinder assembly piston rod;

a second hydraulic cylinder assembly having a second piston dividing a second cylinder into two chambers and a second piston rod connected to the second piston, wherein a first chamber of said second hydraulic cylinder assembly is connected to said first chamber of said first hydraulic cylinder assembly, and said second chamber of said second hydraulic cylinder assembly is connected to said second chamber of said first hydraulic cylinder assembly such that when the piston rod of said first hydraulic cylinder assembly is displaced said first hydraulic fluid displacement is transferred to said second hydraulic cylinder assembly thereby causing a corresponding mechanical displacement of the second piston rod of said second hydraulic cylinder assembly;

a third hydraulic cylinder assembly having a third piston dividing a cylinder into two chambers and a third piston rod connected to the third piston, wherein a first chamber of said third hydraulic cylinder assembly is connected to said first chamber of said first hydraulic cylinder assembly, and said second chamber of said third hydraulic cylinder assembly is connected to said second chamber of said first hydraulic cylinder, and wherein said third piston rod of said third hydraulic cylinder assembly is in communication with the machine member such that movement of said machine member causes a second hydraulic fluid displacement that is transferred to said first and said second hydraulic cylinder assemblies such that said second hydraulic fluid displacement augments the direction of flow of the first hydraulic fluid displacement in said first hydraulic cylinder assembly and opposes the flow of the first hydraulic fluid displacement in said second hydraulic cylinder assembly, thereby permitting said input fitment connected to said first hydraulic cylinder assembly to move in the direction of said applied force and opposing said mechanical displacement of said second hydraulic cylinder piston assembly.

3. The apparatus of claim 2, wherein said driver operator of said power control subassembly comprises:

a feedback arm movably attached to a frame wherein said feedback arm is in communication with said second hydraulic cylinder assembly second piston rod such that it moves in response to a mechanical displacement of said second hydraulic cylinder assembly second piston rod;

a first and a second variable orifice member attached to said frame and in communication with said feedback arm such that the opening of said first and said second variable orifice members are varied in opposition to each other when said feedback arm moves such that as the opening of said first variable orifice member is increased the opening of said second variable orifice member is decreased, and as the opening of said second variable orifice member is increased the opening of said first variable orifice member is decreased;

a first conduit comprising a first end, and a second end, and an opening residing between said first and said second end, wherein said first end is attached to said first variable orifice member;

a second conduit having a first end and a second end, and an opening residing between said first and said second end, wherein said first end is attached to said second variable orifice member;

a source of hydraulic power attached to each of said second ends of said first and second conduits; and a four port directional control valve having additionally a first and a second pilot port, the ports capable of operating the valve, wherein said opening of said first conduit is attached to said first pilot port, and said opening of said second conduit is attached to said second pilot port, whereby a pressure differential is generated across said first and said second pilot ports when said feedback arm is moved.

4. The apparatus of claim 3, wherein said feedback subassembly is comprised of a hydraulic driver assembly in communication with said feedback arm, said hydraulic driver assembly having at least two input ports and a mechanical displacement output member, wherein said hydraulic driver assembly has at least one input port connected to the at least one hydraulic fluid sampling conduit and at least one other inlet port connected to at least one second hydraulic fluid sampling conduit such that a stream of hydraulic fluid directed to said first hydraulic fluid sampling conduit causes said hydraulic driver assembly to move in a direction in opposition to the direction of motion imparted to said hydraulic driver assembly by a stream of hydraulic fluid directed to said second hydraulic fluid sampling conduit, and wherein the movement of said hydraulic driver induced by a stream of hydraulic fluid directed to a hydraulic fluid sampling conduit opposes the motion imparted to said feedback arm by said displacement of said second hydraulic cylinder assembly piston rod.

5. The apparatus of claim 3, wherein said feedback arm is pivotally attached to said frame.

6. The apparatus of claim 3, wherein said feedback arm is slideably attached to said frame.

7. The apparatus of claim 4, wherein said first and second hydraulic fluid sampling conduits are each comprised of:

a shunt conduit having a first end, a second end, and a transfer opening residing between said shunt conduit first and second end;

a first orifice member having an inlet and an outlet, said first orifice member outlet being connected to said shunt conduit first end;

a second orifice member having an inlet and an outlet, said second orifice member inlet being connected to said shunt conduit second end;

a hydraulic fluid supply conduit connected between a source of hydraulic fluid and said first orifice member inlet;

a drain conduit connected between a hydraulic fluid reservoir and said second orifice member outlet; and a transfer conduit having a first end and a second end, said transfer conduit first end being connected to said transfer opening and said transfer conduit second end being connected to said feedback subassembly.

8. The apparatus of claim 7, wherein said first and second orifice members each have adjustable openings.

9. The apparatus of claim 7, wherein the ratio of the area of the opening of said first orifice member to the area of the opening of said second orifice member is in the range between approximately zero to approximately infinity.

10. The apparatus of claim 7, wherein the ratio of the area of the opening of said first orifice member to the area of the opening of said second orifice member is in the range between approximately 0.5–2.0.

11. The apparatus of claim 4, wherein said first and second hydraulic fluid sampling conduits are comprised of:

a shunt conduit having a first end, a second end, and a transfer opening residing between said shunt conduit first and second end;

a first orifice member having an inlet and an outlet, said first orifice member outlet being connected to said shunt conduit first end;

an outlet manifold having an inlet and at least two outlet openings, said inlet being connected to said shunt conduit second end;

a plethora of second orifice members having an inlet and an outlet, each said second orifice member inlet being connected to one opening of each said outlet opening of said outlet manifold;

a hydraulic fluid supply conduit connected between a source of hydraulic fluid and said first orifice member inlet;

a drain conduit connected between a hydraulic fluid reservoir and said second orifice member outlet; and a transfer conduit having a first end and a second end, said transfer conduit first end being connected to said transfer opening and said transfer conduit second end being connected to said feedback subassembly.

12. The apparatus of claim 11, wherein at least one said second orifice member has a fixed opening and at least one other said second orifice member is a pressure relief valve.

13. The apparatus of claim 4, wherein said hydraulic driver assembly is a rotary actuator capable of being driven in either rotational direction and having a first and a second input port, wherein said first input port is connected to said first hydraulic fluid sampling conduit, and said second input port is connected to said second hydraulic fluid sampling conduit, and wherein rotary motion imparted by directing a stream of hydraulic fluid to either the first or the second input port causes said rotary actuator to rotate in a direction that opposes said motion of said feedback arm.

14. The apparatus of claim 4, wherein said hydraulic driver assembly is a double acting hydraulic cylinder assembly having a first and a second inlet port and a piston rod that outputs a mechanical displacement, wherein directing a hydraulic fluid stream to said first or said second inlet port causes said piston rod to move, and wherein motion induced in said piston rod by directing a hydraulic fluid stream to said first inlet port is opposed to motion induced in said piston rod by directing a hydraulic fluid stream to said second inlet port.

15. The apparatus of claim 4, wherein said hydraulic driver assembly is comprised of:

a first piston in communication with said feedback arm and at least partially contained within a first cylinder, wherein a portion of said first piston within said first cylinder forms a first chamber, said first chamber being connected to a first hydraulic fluid sampling conduit such that a stream of hydraulic fluid directed through said first hydraulic fluid sampling conduit causes said first piston to impinge upon said feedback arm;

a second piston in communication with said feedback arm and at least partially contained within a second cylinder, wherein a portion of said second piston within said second cylinder forms a second chamber, said second chamber being connected to said second hydraulic fluid feedback conduit such that a stream of hydraulic fluid directed through said second hydraulic fluid sampling conduit causes said second piston to impinge on said feedback arm in a direction that opposes the hydraulic fluid stream induced impingement of said first piston.

16. The apparatus of claim 15, wherein said driver operator subassembly and said feedback subassembly are mounted in a common machine block.

17. The apparatus of claim 1, wherein said driver operator of said power control subassembly comprises:

a feedback arm movably attached to a frame wherein said feedback arm is in communication with said second hydraulic cylinder assembly second piston rod such that it moves in response to a mechanical displacement of said second hydraulic cylinder assembly second piston rod;

a first and a second variable orifice member attached to said frame and in communication with said feedback arm such that the opening of said first and said second variable orifice members are varied in opposition to each other when said feedback arm moves such that as the opening of said first variable orifice member is increased the opening of said second variable orifice member is decreased, and as the opening of said second variable orifice member is increased the opening of said first variable orifice member is decreased;

a first conduit comprising a first end, and a second end, and an opening residing between said first and said second end, wherein said first end is attached to said first variable orifice member;

a second conduit having a first end and a second end, and an opening residing between said first and said second end, wherein said first end is attached to said second variable orifice member;

a source of hydraulic power attached to said second ends of said first and second conduits; and a four port directional control valve having additionally a first and a second pilot port, said ports capable of operating the valve, wherein said opening of said first conduit is attached to said first pilot port and said opening of said second conduit is attached to said second pilot port, whereby a pressure differential is generated across said first and said second pilot ports when said feedback arm is moved.

18. The apparatus of claim 17, wherein said feedback arm is pivotally attached to said frame.

19. The apparatus of claim 17, wherein said feedback arm is slideably attached to said frame.

20. The apparatus of claim 17, wherein said feedback subassembly is comprised of a hydraulic driver assembly in communication with said feedback arm, and wherein said hydraulic driver assembly is connected to at least one first hydraulic fluid sampling conduit and at least one second hydraulic fluid sampling conduit, such that a stream of hydraulic fluid directed to at least one of said first hydraulic fluid sampling conduits causes said hydraulic driver assembly to move in a direction in opposition to the direction of motion imparted to said hydraulic driver assembly by a stream of hydraulic fluid directed to said second hydraulic fluid sampling conduit, and wherein the movement of said hydraulic driver induced by a stream of hydraulic fluid directed to said first hydraulic fluid sampling conduit opposes a first pivoting motion of said feedback arm, and the movement of said hydraulic driver induced by a stream of hydraulic fluid directed to said second hydraulic fluid sampling conduit opposes a second pivoting motion of said feedback arm, and wherein said first and second said pivoting motions are in opposition.

21. The apparatus of claim 17, wherein said hydraulic driver assembly is a rotary actuator capable of being driven in either rotational direction and having a first and a second input port, wherein said first input port is connected to said first hydraulic fluid sampling conduit, and said second input port is connected to said second hydraulic fluid sampling conduit, and wherein rotary motion imparted by directing a stream of hydraulic fluid to any said input port causes said rotary actuator to rotate in a direction that opposes said pivoting movement of said feedback arm.

22. The apparatus of claim 21, wherein said driver assembly is a double acting hydraulic cylinder assembly having a first and a second inlet port and a piston rod that outputs a mechanical displacement, wherein directing a hydraulic fluid stream to said first or said second inlet port causes said piston rod to move, and wherein motion induced in said piston rod by directing a hydraulic fluid stream to said first inlet port is opposed to motion induced in said piston rod by directing a hydraulic fluid stream to said second inlet port.

23. The apparatus of claim 21, wherein said hydraulic driver assembly is comprised of:
   a first piston in communication with said feedback arm and at least partially contained within a first cylinder, wherein a portion of said first piston within said first cylinder forms a first chamber, said first chamber being in communication with a first hydraulic fluid sampling conduit such that a stream of hydraulic fluid directed through said first hydraulic fluid sampling conduit causes said first piston to impinge upon said feedback arm;
   a second piston in communication with said feedback arm and at least partially contained within a second cylinder, wherein a portion of said second piston within said second cylinder forms a second chamber, said second chamber being in communication with said second hydraulic fluid feedback conduit such that a stream of hydraulic fluid directed through said second hydraulic fluid sampling conduit causes said second piston to impinge on said feedback arm in a direction that opposes the hydraulic fluid stream induced impingement of said first piston.

24. The apparatus of claim 1, wherein said feedback subassembly is comprised of:
   a feedback arm in communication with said mechanical displacement from said operator subassembly;
   a hydraulic driver assembly having at least two input ports and a mechanical displacement output member, said mechanical displacement output member being in communication with said feedback arm, wherein said hydraulic driver assembly has at least one input port connected to at least one first hydraulic fluid sampling conduit, and at least one other inlet port connected to at least one second hydraulic fluid sampling conduit such that a stream of hydraulic fluid directed to said first hydraulic fluid sampling conduit causes said hydraulic driver assembly to move in a direction in opposition to the direction of motion imparted to said hydraulic driver assembly by a stream of hydraulic fluid directed to said second hydraulic fluid sampling conduit, and wherein the movement of said hydraulic driver induced by a stream of hydraulic fluid directed to either the first or the second hydraulic fluid sampling conduit opposes the motion imparted to said feedback arm by said first hydraulic fluid displacement.

25. A manipulator for controlling the movement of a plurality of movable machine members motivated by hydraulic drivers using the natural motion of a human operator, the manipulator comprising:
   A plethora of operator input subassemblies, one operator subassembly for each moveable machine member to be controlled, wherein each operator input subassembly is connected to a fitment that can communicate with an anatomical feature of an operator, and wherein application of a force to the fitment causes the operator input subassembly to output a mechanical displacement and a first hydraulic fluid displacement in a hydraulic circuit associated with that fitment, and wherein an element of the hydraulic circuit associated with said fitment to which force has been applied has at least one member in communication with an associated moving member of a hydraulically powered machine such that the motion of the moving member is translated into a second hydraulic fluid displacement that augments the first hydraulic fluid displacement in the hydraulic circuit associated with the fitment to which force has been applied and opposes the output mechanical displacement;
   a power control subassembly associated with each operator input subassembly, each said power control subassembly having a driver operator, a controllable hydraulic power source, said controllable hydraulic power source producing a stream of pressurized hydraulic fluid, and at least one hydraulic fluid sampling conduit, wherein said driver operator receives the mechanical displacement imparted by the operator input subassembly, said mechanical displacement causing the power control subassembly to engage the controllable hydraulic power source directing the stream of pressurized hydraulic fluid therefrom to at least one hydraulic driver, and wherein a portion of the stream of pressurized hydraulic fluid directed to at least one hydraulic driver is diverted through at least one hydraulic fluid sampling conduit; and
   a feedback subassembly for each said power control subassembly, wherein each feedback subassembly is in communication with at least one hydraulic fluid sampling conduit of the driver operator of one said power control subassembly, wherein hydraulic fluid received from the hydraulic fluid sampling conduit is used to generate a force proportional to a resistance of the hydraulic driver to movement of an associated machine member, and wherein the proportional force is directed opposing the mechanical displacement received by the driver operator from the operator input subassembly.

26. An apparatus for controlling the movement of a machine member the movement of which is controlled by control of a hydraulic driver, the apparatus comprising:

an operator input subassembly comprising at least one iteration of:

a first input hydraulic cylinder assembly having a piston movable along a bore axis of the cylinder such that it divides the cylinder bore into two chambers and wherein a piston rod is connected to the piston such that when the piston rod is displaced along the cylinder bore one of the two chambers is reduced in volume while the other is correspondingly increased in volume such that when the piston rod is displaced hydraulic fluid is drawn into the chamber having an increased volume and expelled from the chamber having a reduced volume causing a first hydraulic fluid displacement;

a fitment connected to said first input hydraulic cylinder assembly piston rod and capable of interfacing with an operator anatomical feature such that a force applied to said fitment having a vector component coincident with the cylinder bore axis displaces said first input hydraulic cylinder assembly piston rod;

a second input hydraulic cylinder assembly having a second piston movable along a bore axis of a second hydraulic cylinder such that it divides the cylinder bore into two chambers, and wherein a second piston rod is connected to the second piston such that when hydraulic fluid is forced into one chamber of the cylinder the piston moves along the cylinder bore, and hydraulic fluid is expelled from the other chamber, and wherein movement of said second input hydraulic cylinder assembly second piston within the cylinder bore causes a corresponding displacement of said second input hydraulic cylinder assembly second piston rod from an initial position, and wherein the said two chambers of said second input hydraulic cylinder assembly are in fluid communication with the corresponding two chambers of said first input hydraulic cylinder assembly such that when the piston rod of said first input hydraulic cylinder assembly is displaced said first hydraulic fluid displacement is transferred to said second input hydraulic cylinder assembly thereby causing a corresponding mechanical displacement of said second input hydraulic cylinder assembly second piston rod;

a third input hydraulic cylinder assembly having a third piston movable along a bore axis of a third hydraulic cylinder such that it divides the cylinder into two chambers and a third piston rod connected to the third input hydraulic cylinder assembly third piston such that when the third input hydraulic cylinder assembly third piston rod is displaced along the cylinder bore the attached third piston moves along the cylinder bore resulting in one of the third input hydraulic cylinder assembly said two chambers being reduced in volume whilst the other is correspondingly increased in volume such that when the third input hydraulic cylinder assembly third piston rod is displaced along the cylinder bore hydraulic fluid is drawn into the chamber having an increased volume and expelled from the chamber having a reduced volume causing a second hydraulic fluid displacement, and wherein said third input hydraulic cylinder assembly third piston rod is in communication with a machine member such that movement of said machine member causes displacement of said third input hydraulic cylinder assembly third piston rod, and wherein the two chambers of said third input hydraulic cylinder assembly are in fluid communication with said corresponding chambers of said first input hydraulic cylinder assembly and said second input hydraulic cylinder assembly such that the second hydraulic fluid displacement is communicated to said first and said second hydraulic cylinder assemblies in a manner that said second hydraulic fluid displacement augments the direction of flow of the first hydraulic fluid displacement in said first input hydraulic cylinder assembly and opposes the direction of flow of the first hydraulic fluid displacement in said second input hydraulic cylinder assembly, thereby permitting said fitment connected to said first input hydraulic cylinder assembly piston rod to move in the direction of said applied force and permitting said second input hydraulic cylinder second piston rod to return to an initial position;

a power control subassembly comprising:

a driver operator, said driver operator comprising:

a feedback arm pivotally attached to a frame wherein said feedback arm is in communication with said second input hydraulic cylinder assembly second piston rod such that it undergoes a displacement from an initial position in response to a mechanical displacement of said second hydraulic cylinder assembly second piston rod from an initial position;

a first and a second variable orifice member attached to said frame and in communication with said feedback arm such that the opening of said first and said second variable orifice members are varied in opposition to each other when said feedback arm is displaced such that, as the opening of said first variable orifice member is increased the opening of said second variable orifice member is decreased, and as the opening of said second variable orifice member is increased the opening of said first variable orifice member is decreased;

a first conduit comprising a first end, and a second end, and a pilot opening residing between said first and said second end, wherein said first end is connected to said first variable orifice member;

a second conduit having a first end and a second end, and a pilot opening residing between said first and said second end, wherein said first end is connected to said second variable orifice member;

a controllable hydraulic power source;

said controllable hydraulic power source comprising at least one iteration of:

a hydraulic power conduit having an inlet and an outlet and having two sampling orifice openings located between the inlet and the outlet, wherein said second ends of said power control subassembly driver operator first and second conduits are attached to said sampling orifice openings such that a portion of the fluid conducted through the power conduit is diverted through said first and second conduits and thence through said power control subassembly driver operator variable orifice members;

a motor driven hydraulic pump having at least one inlet and at least one outlet, said outlet being connected to said inlet of said hydraulic power conduit;

a reservoir having at least one outlet and being capable of holding a quantity of a hydraulic fluid and wherein said at least one outlet is connected to said at least one hydraulic pump inlet such that hydraulic fluid flows from said reservoir to said hydraulic pump thereby supplying said hydraulic pump with fluid to pump;

a four port directional control valve having main ports 1–4 wherein controllable hydraulic power source hydraulic power conduit outlet end is attached to port 1, and wherein the valve can be switched between three connection states such that in a first state port 1 is connected to port 3 whilst port 2 is connected to port 4, in a second state port 1 is connected to port 4 whilst port 2 is connected to port 3, and in a third state no port is connected to any other port, said four port directional control valve having additionally first and second pilot ports capable of switching said directional control valve between said three states, wherein said pilot opening of said power control subassembly driver operator first conduit is connected to said first pilot port, and said pilot opening of said power control subassembly driver operator second conduit is connected to said second pilot port, and whereby said four port directional control valve is switched between said three states by controlling a pressure differential across said first and said second pilot ports through movement of said power control subassembly driver operator feedback arm;

a return conduit having an inlet end and an outlet end, wherein said inlet end is connected to said port 2 of said four port directional control valve and said outlet end is connected to said reservoir such that fluid is conducted from the four port directional control valve to the reservoir;

a first hydraulic fluid diverting conduit having at least one inlet and at least one outlet, wherein said inlet is connected to port 3 of said four port directional control valve;

a second hydraulic fluid diverting conduit having at least one inlet and at least one outlet, wherein said inlet is connected to port 4 of said four port directional control valve;

a first hydraulic fluid sampling conduit comprising:
 a shunt conduit having a first end, a second end, and a transfer opening residing between said shunt conduit first and second end;
 a first orifice member having an inlet and an outlet, said first orifice member inlet being connected to said power control subassembly controllable hydraulic power source first hydraulic fluid diverting conduit said at least one outlet, and said first orifice member outlet being connected to said shunt conduit first end;
 a second orifice member having an inlet and an outlet, said second orifice member inlet being connected to said shunt conduit second end;
 a drain conduit connected between the reservoir and said second orifice member outlet;
 a transfer conduit having a first end and a second end, said transfer conduit first end being connected to said shunt conduit transfer opening;

a second hydraulic fluid sampling conduit comprising:
 a shunt conduit having a first end, a second end, and a transfer opening residing between said shunt conduit first and second end;
 a first orifice member having an inlet and an outlet, said first orifice member inlet being connected to said power control subassembly controllable hydraulic power source second hydraulic fluid diverting conduit said at least one outlet, and said first orifice member outlet being connected to said shunt conduit first end;
 a second orifice member having an inlet and an outlet, said second orifice member inlet being connected to said shunt conduit second end;
 a drain conduit connected between the reservoir and said second orifice member outlet;
 a transfer conduit having a first end and a second end, said transfer conduit first end being connected to said shunt conduit transfer opening;

a feedback subassembly comprising:
 a hydraulic driver assembly in communication with said power control subassembly driver operator feedback arm, said hydraulic driver assembly having at least two input ports and a mechanical displacement output member, wherein said hydraulic driver assembly has at least one input port connected to said power control subassembly first hydraulic fluid sampling conduit transfer conduit second end, and at least one other input port connected to said power control subassembly second hydraulic fluid sampling conduit transfer conduit second end such that a stream of hydraulic fluid directed to said power control subassembly first hydraulic fluid sampling conduit causes said hydraulic driver assembly to move in a direction in opposition to the direction of motion imparted to said hydraulic driver assembly by a stream of hydraulic fluid directed to said power control subassembly second hydraulic fluid sampling conduit, and wherein the movement of said hydraulic driver induced by a stream of hydraulic fluid directed to a hydraulic fluid sampling conduit opposes the motion imparted to said feedback arm by said displacement of said second hydraulic cylinder assembly second piston rod, and wherein a stream of hydraulic fluid directed to a port of said feedback subassembly hydraulic driver generates a force that tends to restore the power control subassembly driver operator feedback arm to an initial position; and
 a hydraulic driver assembly in communication with a movable machine member;
 said hydraulic driver assembly having at least two input ports and a mechanical displacement output member;
 said mechanical displacement output member moving in response to hydraulic power being applied to one input port such that movement is imparted to the movable machine member in communication with said hydraulic driver assembly; and
 wherein said hydraulic driver assembly has at least one input port connected to said power control subassembly controllable hydraulic power source four port directional control valve port 3, and at least one other input port is connected to said power control subassembly controllable hydraulic power source four port directional control valve port 4 such that a stream of hydraulic fluid issuing from said directional control valve port 3 causes said hydraulic driver assembly to move in a direction opposite to that movement induced by a stream of hydraulic fluid issuing from said directional control valve port 4.

27. An apparatus for controlling the movement of a machine member the movement of which is controlled by control of a hydraulic driver, the apparatus comprising:

an operator input subassembly comprising at least one iteration of:

a first input hydraulic cylinder assembly having a piston movable along a bore axis of the cylinder such that it divides the cylinder bore into two chambers and wherein a piston rod is connected to the piston such that when the piston rod is displaced along the cylinder bore one of the two chambers is reduced in volume while the other is correspondingly increased in volume such that when the piston rod is displaced hydraulic fluid is drawn into the chamber having an increased volume and expelled from the chamber having a reduced volume causing a first hydraulic fluid displacement;

a fitment connected to said first input hydraulic cylinder assembly piston rod and capable of interfacing with an operator anatomical feature such that a force applied to said fitment having a vector component coincident with the cylinder bore axis displaces said first input hydraulic cylinder assembly piston rod;

a second input hydraulic cylinder assembly having a second piston movable along a bore axis of a second hydraulic cylinder such that it divides the cylinder bore into two chambers, and wherein a second piston rod is connected to the second piston such that when hydraulic fluid is forced into one chamber of the cylinder the piston moves along the cylinder bore, and hydraulic fluid is expelled from the other chamber, and wherein movement of said second input hydraulic cylinder assembly second piston within the cylinder bore causes a corresponding displacement of said second input hydraulic cylinder assembly second piston rod from an initial position, and wherein the said two chambers of said second input hydraulic cylinder assembly are in fluid communication with the corresponding two chambers of said first input hydraulic cylinder assembly such that when the piston rod of said first input hydraulic cylinder assembly is displaced said first hydraulic fluid displacement is transferred to said second input hydraulic cylinder assembly thereby causing a corresponding mechanical displacement of said second input hydraulic cylinder assembly second piston rod;

a third input hydraulic cylinder assembly having a third piston movable along a bore axis of a third hydraulic cylinder such that it divides the cylinder into two chambers, and a third piston rod connected to the third input hydraulic cylinder assembly third piston such that when the third input hydraulic cylinder assembly third piston rod is displaced along the cylinder bore the attached third piston moves along the cylinder bore resulting in one of the third input hydraulic cylinder assembly two chambers being reduced in volume whilst the other is correspondingly increased in volume, such that when the third input hydraulic cylinder assembly third piston rod is displaced along the cylinder bore hydraulic fluid is drawn into the chamber having an increased volume and expelled from the chamber having a reduced volume causing a second hydraulic fluid displacement, and wherein said third input hydraulic cylinder assembly third piston rod is in communication with a machine member such that movement of said machine member causes displacement of said third input hydraulic cylinder assembly third piston rod, and wherein the two chambers of said third input hydraulic cylinder assembly are in fluid communication with said corresponding chambers of said first input hydraulic cylinder assembly and said second input hydraulic cylinder assembly such that the second hydraulic fluid displacement is communicated to said first and said second hydraulic cylinder assemblies in a manner that said second hydraulic fluid displacement augments the direction of flow of the first hydraulic fluid displacement in said first input hydraulic cylinder assembly and opposes the direction of flow of the first hydraulic fluid displacement in said second input hydraulic cylinder assembly, thereby permitting said fitment connected to said first input hydraulic cylinder assembly piston rod to move in the direction of said applied force and permitting said second input hydraulic cylinder piston rod to return to an initial position;

a power control subassembly comprising:

a driver operator, said driver operator comprising:

a feedback arm slidably attached to a frame wherein said feedback arm is in communication with said second input hydraulic cylinder assembly second piston rod such that it undergoes a displacement from an initial position in response to a mechanical displacement of said second hydraulic cylinder assembly second piston rod from an initial position;

a first and a second variable orifice member attached to said frame and in communication with said feedback arm such that the opening of said first and said second variable orifice members are varied in opposition to each other when said feedback arm is displaced such that, as the opening of said first variable orifice member is increased the opening of said second variable orifice member is decreased, and as the opening of said second variable orifice member is increased the opening of said first variable orifice member is decreased;

a first conduit comprising a first end, and a second end, and a pilot opening residing between said first and said second end, wherein said first end is connected to said first variable orifice member;

a second conduit having a first end and a second end, and a pilot opening residing between said first and said second end, wherein said first end is connected to said second variable orifice member;

a controllable hydraulic power source comprising at least one iteration of:

a hydraulic power conduit having an inlet and an outlet and having two sampling orifice openings located between the inlet and the outlet, wherein said second ends of said power control subassembly driver operator first and second conduits are attached to said sampling orifice openings such that a portion of the fluid conducted through the power conduit is diverted through said first and second conduits and thence through said power control subassembly driver operator variable orifice members;

a motor driven hydraulic pump having at least one inlet and at least one outlet, said outlet being connected to said inlet of said hydraulic power conduit;

a reservoir having at least one outlet and being capable of holding a quantity of a hydraulic fluid and wherein said at least one outlet is connected to said at least one hydraulic pump inlet such that hydraulic fluid flows from said reservoir to said hydraulic pump thereby supplying said hydraulic pump with fluid to pump;

a four port directional control valve having main ports 1–4 wherein controllable hydraulic power source hydraulic power conduit outlet end is attached to port 1, and wherein the valve can be switched between three connection states such that in a first state port 1 is connected to port 3 whilst port 2 is connected to port 4, in a second state port 1 is connected to port 4 whilst port 2 is connected to port 3, and in a third state no port is connected to any other port, said four port directional control valve having additionally first and second pilot ports capable of switching said directional control valve between said three states, wherein said pilot opening of said power control subassembly driver operator first conduit is connected to said first pilot port, and said pilot opening of said power control subassembly driver operator second conduit is connected to said second pilot port, and whereby said four port directional control valve is switched between said three states by controlling a pressure differential across said first and said second pilot ports through movement of said power control subassembly driver operator feedback arm;

a return conduit having an inlet end and an outlet end, wherein said inlet end is connected to said port 2 of said four port directional control valve and said outlet end is connected to said reservoir such that fluid is conducted from the four port directional control valve to the reservoir;

a first hydraulic fluid diverting conduit having at least one inlet and at least one outlet, wherein said inlet is connected to port 3 of said four port directional control valve;

a second hydraulic fluid diverting conduit having at least one inlet and at least one outlet, wherein said inlet is connected to port 4 of said four port directional control valve;

a first hydraulic fluid sampling conduit comprising:

a shunt conduit having a first end, a second end, and a transfer opening residing between said shunt conduit first and second end;

a first orifice member having an inlet and an outlet, said first orifice member inlet being connected to said power control subassembly controllable hydraulic power source first hydraulic fluid diverting conduit said at least one outlet, and said first orifice member outlet being connected to said shunt conduit first end;

a second orifice member having an inlet and an outlet, said second orifice member inlet being connected to said shunt conduit second end;

a drain conduit connected between the reservoir and said second orifice member outlet;

a transfer conduit having a first end and a second end, said transfer conduit first end being connected to said shunt conduit transfer opening;

a second hydraulic fluid sampling conduit comprising:

a shunt conduit having a first end, a second end, and a transfer opening residing between said shunt conduit first and second end;

a first orifice member having an inlet and an outlet, said first orifice member inlet being connected to said power control subassembly controllable hydraulic power source second hydraulic fluid diverting conduit said at least one outlet, and said first orifice member outlet being connected to said shunt conduit first end;

a second orifice member having an inlet and an outlet, said second orifice member inlet being connected to said shunt conduit second end;

a drain conduit connected between the reservoir and said second orifice member outlet;

a transfer conduit having a first end and a second end, said transfer conduit first end being connected to said shunt conduit transfer opening;

a feedback subassembly comprising:

a hydraulic driver assembly in communication with said power control subassembly driver operator feedback arm, said hydraulic driver assembly having at least two input ports and a mechanical displacement output member, wherein said hydraulic driver assembly has at least one input port connected to said power control subassembly first hydraulic fluid sampling conduit transfer conduit second end, and at least one other input port connected to said power control subassembly second hydraulic fluid sampling conduit transfer conduit second end such that a stream of hydraulic fluid directed to said power control subassembly first hydraulic fluid sampling conduit causes said hydraulic driver assembly to move in a direction in opposition to the direction of motion imparted to said hydraulic driver assembly by a stream of hydraulic fluid directed to said power control subassembly second hydraulic fluid sampling conduit, and wherein the movement of said hydraulic driver induced by a stream of hydraulic fluid directed to a hydraulic fluid sampling conduit opposes the motion imparted to said feedback arm by said displacement of said second hydraulic cylinder assembly second piston rod, and wherein a stream of hydraulic fluid directed to a port of said feedback subassembly hydraulic driver generates a force that tends to restore the power control subassembly driver operator feedback arm to an initial position; and a hydraulic driver assembly in communication with a movable machine member, said hydraulic driver assembly having at least two input ports and a mechanical displacement output member, said mechanical displacement output member moving in response to hydraulic power being applied to one input port such that movement is imparted to the movable machine member in communication with said hydraulic driver assembly, and wherein said hydraulic driver assembly has at least one input port connected to said power control subassembly controllable hydraulic power source four port directional control valve port 3 and at least one other input port is connected to said power control subassembly controllable hydraulic power source four port directional control valve port 4 such that a stream of hydraulic fluid issuing from said directional control valve port 3 causes said hydraulic driver assembly to move in a direction opposite to that movement induced by a stream of hydraulic fluid issuing from said directional control valve port 4.

28. An apparatus for controlling the movement of a machine member the movement of which is controlled by control of a hydraulic driver, the apparatus comprising:

an operator input subassembly comprising at least one iteration of:
  a first input hydraulic cylinder assembly having a piston movable along a bore axis of the cylinder such that it divides the cylinder bore into two chambers and wherein a piston rod is connected to the piston such that when the piston rod is displaced along the cylinder bore one of the two chambers is reduced in volume while the other is correspondingly increased in volume such that when the piston rod is displaced hydraulic fluid is drawn into the chamber having an increased volume and expelled from the chamber having a reduced volume causing a first hydraulic fluid displacement;
  a fitment connected to said first input hydraulic cylinder assembly piston rod and capable of interfacing with an operator anatomical feature such that a force applied to said fitment having a vector component coincident with the cylinder bore axis displaces said first input hydraulic cylinder assembly piston rod;
  a second input hydraulic cylinder assembly having a second piston movable along a bore axis of a second hydraulic cylinder such that it divides the cylinder bore into two chambers and wherein a second piston rod is connected to the second piston such that when hydraulic fluid is forced into one chamber of the cylinder the second piston moves along the cylinder bore and hydraulic fluid is expelled from the other chamber, and wherein movement of said second input hydraulic cylinder assembly second piston within the cylinder bore causes a corresponding displacement of said second input hydraulic cylinder assembly second piston rod from an initial position, and wherein the said two chambers of said second input hydraulic cylinder assembly are in fluid communication with the corresponding two chambers of said first input hydraulic cylinder assembly such that when the piston rod of said first input hydraulic cylinder assembly is displaced said first hydraulic fluid displacement is transferred to said second input hydraulic cylinder assembly thereby causing a corresponding mechanical displacement of said second input hydraulic cylinder assembly second piston rod;
  a third input hydraulic cylinder assembly having a third piston movable along a bore axis of a third hydraulic cylinder such that it divides the cylinder into two chambers and a third piston rod connected to the third input hydraulic cylinder assembly third piston such that when the third input hydraulic cylinder assembly third piston rod is displaced along the cylinder bore the attached piston moves along the cylinder bore resulting in one of the third input hydraulic cylinder assembly said two chambers being reduced in volume whilst the other is correspondingly increased in volume such that when the third input hydraulic cylinder assembly third piston rod is displaced along the cylinder bore hydraulic fluid is drawn into the chamber having an increased volume and expelled from the chamber having a reduced volume causing a second hydraulic fluid displacement, and wherein said third input hydraulic cylinder assembly third piston rod is in communication with a machine member such that movement of said machine member causes displacement of said third input hydraulic cylinder assembly third piston rod, and wherein the two chambers of said third input hydraulic cylinder assembly are in fluid communication with said corresponding chambers of said first input hydraulic cylinder assembly and said second input hydraulic cylinder assembly such that the second hydraulic fluid displacement is communicated to said first and said second hydraulic cylinder assemblies in a manner that said second hydraulic fluid displacement augments the direction of flow of the first hydraulic fluid displacement in said first input hydraulic cylinder assembly and opposes the direction of flow of the first hydraulic fluid displacement in said second input hydraulic cylinder assembly, thereby permitting said fitment connected to said first input hydraulic cylinder assembly piston rod to move in the direction of said applied force and permitting said second input hydraulic cylinder second piston rod to return to an initial position;

a power control subassembly comprising:
  a driver operator, said driver operator comprising:
    a feedback arm pivotally attached to a frame wherein said feedback arm is in communication with said second input hydraulic cylinder assembly second piston rod such that it undergoes a displacement from an initial position in response to a mechanical displacement of said second hydraulic cylinder assembly second piston rod from an initial position;
    a first and a second variable orifice member attached to said frame and in communication with said feedback arm such that the opening of said first and said second variable orifice members are varied in opposition to each other when said feedback arm is displaced such that, as the opening of said first variable orifice member is increased the opening of said second variable orifice member is decreased, and as the opening of said second variable orifice member is increased the opening of said first variable orifice member is decreased;
    a first conduit comprising a first end, and a second end, and a pilot opening residing between said first and said second end, wherein said first end is connected to said first variable orifice member;
    a second conduit having a first end and a second end, and a pilot opening residing between said first and said second end, wherein said first end is connected to said second variable orifice member;
  a controllable hydraulic power source comprising at least one iteration of:
    a hydraulic power conduit having an inlet and an outlet and having two sampling orifice openings located between the inlet and the outlet, wherein said second ends of said power control subassembly driver operator first and second conduits are attached to said sampling orifice openings such that a portion of the fluid conducted through the power conduit is diverted through said first and second conduits and thence through said power control subassembly driver operator variable orifice members;

a motor driven hydraulic pump having at least one inlet and at least one outlet, said outlet being connected to said inlet of said hydraulic power conduit;

a reservoir having at least one outlet and being capable of holding a quantity of a hydraulic fluid and wherein said at least one outlet is connected to said at least one hydraulic pump inlet such that hydraulic fluid flows from said reservoir to said hydraulic pump thereby supplying said hydraulic pump with fluid to pump;

a four port directional control valve having main ports 1–4 wherein controllable hydraulic power source hydraulic power conduit outlet end is attached to port 1, and wherein the valve can be switched between three connection states such that in a first state port 1 is connected to port 3 whilst port 2 is connected to port 4, in a second state port 1 is connected to port 4 whilst port 2 is connected to port 3, and in a third state no port is connected to any other port, said four port directional control valve having additionally first and second pilot ports capable of switching said directional control valve between said three states, wherein said pilot opening of said power control subassembly driver operator first conduit is connected to said first pilot port, and said pilot opening of said power control subassembly driver operator second conduit is connected to said second pilot port, and whereby said four port directional control valve is switched between said three states by controlling a pressure differential across said first and said second pilot ports through movement of said power control subassembly driver operator feedback arm;

a return conduit having an inlet end and an outlet end, wherein said inlet end is connected to said port 2 of said four port directional control valve and said outlet end is connected to said reservoir such that fluid is conducted from the four port directional control valve to the reservoir;

a first hydraulic fluid diverting conduit having at least one inlet and at least one outlet, wherein said inlet is connected to port 3 of said four port directional control valve;

a second hydraulic fluid diverting conduit having at least one inlet and at least one outlet, wherein said inlet is connected to port 4 of said four port directional control valve;

a first hydraulic fluid sampling conduit comprising:
  a shunt conduit having a first end, a second end, and a transfer opening residing between said shunt conduit first and second end;
  a first orifice member having an inlet and an outlet, said first orifice member inlet being connected to said power control subassembly controllable hydraulic power source first hydraulic fluid diverting conduit said at least one outlet, and said first orifice member outlet being connected to said shunt conduit first end;
  an outlet manifold having an inlet and at least two outlet openings, said inlet being connected to said shunt conduit second end;
  a plethora of second orifice members, each having an inlet and an outlet, each said second orifice member inlet being connected to one opening of each said outlet opening of said outlet manifold;
  a drain conduit connected between the reservoir and said second orifice member outlet;
  a transfer conduit having a first end and a second end, said transfer conduit first end being connected to said shunt conduit transfer opening;

a second hydraulic fluid sampling conduit comprising:
  a shunt conduit having a first end, a second end, and a transfer opening residing between said shunt conduit first and second end;
  a first orifice member having an inlet and an outlet, said first orifice member inlet being connected to said power control subassembly controllable hydraulic power source second hydraulic fluid diverting conduit said at least one outlet, and said first orifice member outlet being connected to said shunt conduit first end;
  an outlet manifold having an inlet and at least two outlet openings, said inlet being connected to said shunt conduit second end;
  a plethora of second orifice members, each having an inlet and an outlet, each said second orifice member inlet being connected to one opening of each said outlet opening of said outlet manifold;
  a drain conduit connected between the reservoir and said second orifice member outlet;
  a transfer conduit having a first end and a second end, said transfer conduit first end being connected to said shunt conduit transfer opening;

a feedback subassembly comprising:
  a hydraulic driver assembly in communication with said power control subassembly driver operator feedback arm, said hydraulic driver assembly having at least two input ports and a mechanical displacement output member, wherein said hydraulic driver assembly has at least one input port connected to said power control subassembly first hydraulic fluid sampling conduit transfer conduit second end, and at least one other input port connected to said power control subassembly second hydraulic fluid sampling conduit transfer conduit second end such that a stream of hydraulic fluid directed to said power control subassembly first hydraulic fluid sampling conduit causes said hydraulic driver assembly to move in a direction in opposition to the direction of motion imparted to said hydraulic driver assembly by a stream of hydraulic fluid directed to said power control subassembly second hydraulic fluid sampling conduit, and wherein the movement of said hydraulic driver induced by a stream of hydraulic fluid directed to a hydraulic fluid sampling conduit opposes the motion imparted to said feedback arm by said displacement of said second hydraulic cylinder assembly second piston rod, and wherein a stream of hydraulic fluid directed to a port of said feedback subassembly hydraulic driver generates a force that tends to restore the power control subassembly driver operator feedback arm to an initial position; and a hydraulic driver assembly in communication with a movable machine member, said hydraulic driver assembly having at least two input ports and a mechanical displacement output member, said mechanical displacement output member moving in response to hydraulic power being applied to one input port such that movement is imparted to the movable machine member in communication with said hydraulic driver assembly, and wherein said hydraulic driver assembly has at least one input port connected to said power control subassembly controllable hydraulic power source four port directional control valve port 3 and at least one other input port is connected to said power control subassembly controllable hydraulic power source four port directional control valve port 4 such that a stream of hydraulic fluid issuing from said directional control valve port 3 causes said hydraulic driver assembly to move in a direction opposite to that movement induced by a stream of hydraulic fluid issuing from said directional control valve port 4.

29. An apparatus for controlling the movement of a machine member the movement of which is controlled by control of a hydraulic driver, the apparatus comprising:
an operator input subassembly comprising at least one iteration of:
a first input hydraulic cylinder assembly having a piston movable along a bore axis of the cylinder such that it divides the cylinder bore into two chambers and wherein a piston rod is connected to the piston such that when the piston rod is displaced along the cylinder bore one of the two chambers is reduced in volume while the other is correspondingly increased in volume such that when the piston rod is displaced hydraulic fluid is drawn into the chamber having an increased volume and expelled from the chamber having a reduced volume causing a first hydraulic fluid displacement;
a fitment connected to said first input hydraulic cylinder assembly piston rod and capable of interfacing with an operator anatomical feature such that a force applied to said fitment having a vector component coincident with the cylinder bore axis displaces said first input hydraulic cylinder assembly piston rod;
a second input hydraulic cylinder assembly having a second piston movable along a bore axis of a second hydraulic cylinder such that it divides the cylinder bore into two chambers and wherein a second piston rod is connected to the piston such that when hydraulic fluid is forced into one chamber of the cylinder the piston moves along the cylinder bore and hydraulic fluid is expelled from the other chamber, and wherein movement of said second input hydraulic cylinder assembly second piston within the cylinder bore causes a corresponding displacement of said second input hydraulic cylinder assembly second piston rod from an initial position, and wherein the said two chambers of said second input hydraulic cylinder assembly are in fluid communication with the corresponding two chambers of said first input hydraulic cylinder assembly such that when the piston rod of said first input hydraulic cylinder assembly is displaced said first hydraulic fluid displacement is transferred to said second input hydraulic cylinder assembly thereby causing a corresponding mechanical displacement of said second input hydraulic cylinder assembly second piston rod;
a third input hydraulic cylinder assembly having a third piston movable along a bore axis of a third hydraulic cylinder such that it divides the cylinder into two chambers and a third piston rod connected to the third input hydraulic cylinder assembly third piston such that when the third input hydraulic cylinder assembly third piston rod is displaced along the cylinder bore the attached third piston moves along the cylinder bore resulting in one of the third input hydraulic cylinder assembly said two chambers being reduced in volume whilst the other is correspondingly increased in volume such that when the third input hydraulic cylinder assembly third piston rod is displaced along the cylinder bore hydraulic fluid is drawn into the chamber having an increased volume and expelled from the chamber having a reduced volume causing a second hydraulic fluid displacement, and wherein said third input hydraulic cylinder assembly third piston rod is in communication with a machine member such that movement of said machine member causes displacement of said third input hydraulic cylinder assembly third piston rod, and wherein the two chambers of said third input hydraulic cylinder assembly are in fluid communication with said corresponding chambers of said first input hydraulic cylinder assembly and said second input hydraulic cylinder assembly such that the second hydraulic fluid displacement is communicated to said first and said second hydraulic cylinder assemblies in a manner that said second hydraulic fluid displacement augments the direction of flow of the first hydraulic fluid displacement in said first input hydraulic cylinder assembly and opposes the direction of flow of the first hydraulic fluid displacement in said second input hydraulic cylinder assembly, thereby permitting said fitment connected to said first input hydraulic cylinder assembly piston rod to move in the direction of said applied force and permitting said second input hydraulic cylinder second piston rod to return to an initial position;
a power control subassembly comprising:
a driver operator, said driver operator comprising:
a feedback arm slidably attached to a frame wherein said feedback arm is in communication with said second input hydraulic cylinder assembly second piston rod such that it undergoes a displacement from an initial position in response to a mechanical displacement of said second hydraulic cylinder assembly second piston rod from an initial position;
a first and a second variable orifice member attached to said frame and in communication with said feedback arm such that the opening of said first and said second variable orifice members are varied in opposition to each other when said feedback arm is displaced such that, as the opening of said first variable orifice member is increased the opening of said second variable orifice member is decreased, and as the opening of said second variable orifice member is increased the opening of said first variable orifice member is decreased;
a first conduit comprising a first end, and a second end, and a pilot opening residing between said first and said second end, wherein said first end is connected to said first variable orifice member;
a second conduit having a first end and a second end, and a pilot opening residing between said first and said second end, wherein said first end is connected to said second variable orifice member;
a controllable hydraulic power source comprising at least one iteration of:

a hydraulic power conduit having an inlet and an outlet and having two sampling orifice openings located between the inlet and the outlet, wherein said second ends of said power control subassembly driver operator first and second conduits are attached to said sampling orifice openings such that a portion of the fluid conducted through the power conduit is diverted through said first and second conduits and thence through said power control subassembly driver operator variable orifice members;

a motor driven hydraulic pump having at least one inlet and at least one outlet, said outlet being connected to said inlet of said hydraulic power conduit;

a reservoir having at least one outlet and being capable of holding a quantity of a hydraulic fluid and wherein said at least one outlet is connected to said at least one hydraulic pump inlet such that hydraulic fluid flows from said reservoir to said hydraulic pump thereby supplying said hydraulic pump with fluid to pump;

a four port directional control valve having main ports 1–4 wherein controllable hydraulic power source hydraulic power conduit outlet end is attached to port 1, and wherein the valve can be switched between three connection states such that in a first state port 1 is connected to port 3 whilst port 2 is connected to port 4, in a second state port 1 is connected to port 4 whilst port 2 is connected to port 3, and in a third state no port is connected to any other port, said four port directional control valve having additionally first and second pilot ports capable of switching said directional control valve between said three states, wherein said pilot opening of said power control subassembly driver operator first conduit is connected to said first pilot port, and said pilot opening of said power control subassembly driver operator second conduit is connected to said second pilot port, and whereby said four port directional control valve is switched between said three states by controlling a pressure differential across said first and said second pilot ports through movement of said power control subassembly driver operator feedback arm;

a return conduit having an inlet end and an outlet end, wherein said inlet end is connected to said port 2 of said four port directional control valve and said outlet end is connected to said reservoir such that fluid is conducted from the four port directional control valve to the reservoir;

a first hydraulic fluid diverting conduit having at least one inlet and at least one outlet, wherein said inlet is connected to port 3 of said four port directional control valve;

a second hydraulic fluid diverting conduit having at least one inlet and at least one outlet, wherein said inlet is connected to port 4 of said four port directional control valve;

a first hydraulic fluid sampling conduit comprising:
  a shunt conduit having a first end, a second end, and a transfer opening residing between said shunt conduit first and second end;
  a first orifice member having an inlet and an outlet, said first orifice member inlet being connected to said power control subassembly controllable hydraulic power source first hydraulic fluid diverting conduit said at least one outlet, and said first orifice member outlet being connected to said shunt conduit first end;
  an outlet manifold having an inlet and at least two outlet openings, said inlet being connected to said shunt conduit second end;
  a plethora of second orifice members, each having an inlet and an outlet, each said second orifice member inlet being connected to one opening of each said outlet opening of said outlet manifold;
  a drain conduit connected between the reservoir and said second orifice member outlet;
  a transfer conduit having a first end and a second end, said transfer conduit first end being connected to said shunt conduit transfer opening;

a second hydraulic fluid sampling conduit comprising:
  a shunt conduit having a first end, a second end, and a transfer opening residing between said shunt conduit first and second end;
  a first orifice member having an inlet and an outlet, said first orifice member inlet being connected to said power control subassembly controllable hydraulic power source second hydraulic fluid diverting conduit said at least one outlet, and said first orifice member outlet being connected to said shunt conduit first end;
  an outlet manifold having an inlet and at least two outlet openings, said inlet being connected to said shunt conduit second end;
  a plethora of second orifice members, each having an inlet and an outlet, each said second orifice member inlet being connected to one opening of each said outlet opening of said outlet manifold;
  a drain conduit connected between the reservoir and said second orifice member outlet;
  a transfer conduit having a first end and a second end, said transfer conduit first end being connected to said shunt conduit transfer opening;

a feedback subassembly comprising:
  a hydraulic driver assembly in communication with said power control subassembly driver operator feedback arm, said hydraulic driver assembly having at least two input ports and a mechanical displacement output member, wherein said hydraulic driver assembly has at least one input port connected to said power control subassembly first hydraulic fluid sampling conduit transfer conduit second end, and at least one other input port connected to said power control subassembly second hydraulic fluid sampling conduit transfer conduit second end such that a stream of hydraulic fluid directed to said power control subassembly first hydraulic fluid sampling conduit causes said hydraulic driver assembly to move in a direction in opposition to the direction of motion imparted to said hydraulic driver assembly by a stream of hydraulic fluid directed to said power control subassembly second hydraulic fluid sampling conduit, and wherein the movement of said hydraulic driver induced by a stream of hydraulic fluid directed to a hydraulic fluid sampling conduit opposes the motion imparted to said feedback arm by said displacement of said second hydraulic cylinder assembly second piston rod, and wherein a stream of hydraulic fluid directed to a port of said feedback subassembly hydraulic driver generates a force that tends to restore the power control subassembly driver operator feedback arm to an initial position; and a hydraulic driver assembly in communication with a movable machine member, said hydraulic driver assembly having at least two input ports and a mechanical displacement output member, said mechanical displacement output member moving in response to hydraulic power being applied to one input port such that movement is imparted to the movable machine member in communication with said hydraulic driver assembly, and wherein said hydraulic driver assembly has at least one input port connected to said power control subassembly controllable hydraulic power source four port directional control valve port 3 and at least one other input port is connected to said power control subassembly controllable hydraulic power source four port directional control valve port 4 such that a stream of hydraulic fluid issuing from said directional control valve port 3 causes said hydraulic driver assembly to move in a direction opposite to that movement induced by a stream of hydraulic fluid issuing from said directional control valve port 4.

30. The apparatus of claim 25, wherein said operator input subassembly utilizes a low viscosity working fluid, as a hydraulic working fluid and said machine member driver utilizes a high viscosity hydraulic fluid as a working fluid.

31. A process for controlling the motion of a machine member motivated by a hydraulic driver, said process comprising the steps of:

translating the force exerted by the anatomy of a human operator into a first hydraulic fluid displacement in a closed loop hydraulic control system;

displacing a control member from an initial position with the first hydraulic fluid displacement;

actuating a directional control valve with said control member displacement, thereby directing a stream of hydraulic fluid to a first hydraulic driver and thereby operating said hydraulic driver;

communicating the motion of the first hydraulic driver to a machine member, thereby moving said machine member;

diverting a portion of said stream of hydraulic fluid directed to the first hydraulic driver to a feedback driver such that the feedback driver outputs a force proportionate to the force exerted by the first hydraulic driver;

applying the output force of said feedback driver to the control member, thereby imposing upon the control member a force that tends to restore it to said initial position, wherein the restoring force is proportionate to the force exerted by the first hydraulic driver;

translating the motion of the machine member being moved by the first hydraulic driver to a second hydraulic fluid displacement proportionate to the motion of the machine member;

directing the second hydraulic fluid displacement into the closed loop hydraulic control system such that it augments the first hydraulic fluid displacement and opposes said control member displacement; and transferring the second hydraulic fluid displacement and the restoring force exerted against said control member to the anatomy of a human operator, thereby imparting information on a tactile level regarding the position, speed, direction of movement, and resistance to movement of an associated machine member.

* * * * *